United States Patent
Akahane

(10) Patent No.: US 9,456,099 B2
(45) Date of Patent: Sep. 27, 2016

(54) OPENING/CLOSING DEVICE THAT OPENS AND CLOSES OPENING/CLOSING MEMBER, AND IMAGE READING APPARATUS

(71) Applicant: SEIKO EPSON CORPORATION, Tokyo (JP)

(72) Inventor: Hisayuki Akahane, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/799,759

(22) Filed: Jul. 15, 2015

(65) Prior Publication Data

US 2016/0017649 A1    Jan. 21, 2016

(30) Foreign Application Priority Data

Jul. 17, 2014   (JP) .................................. 2014-146850

(51) Int. Cl.
*H04N 1/04*   (2006.01)
*H04N 1/00*   (2006.01)

(52) U.S. Cl.
CPC ...... *H04N 1/00557* (2013.01); *H04N 1/00554* (2013.01)

(58) Field of Classification Search
CPC .................. B65H 2404/6111; B65H 2801/06; B65H 5/00; B65H 5/36; B65H 2404/25; B65H 2404/7414; B65H 2601/11; H04N 1/00519; H04N 1/00554; H04N 1/00543; H04N 1/12; H04N 1/2032
USPC ........ 399/111, 121, 380, 110, 124, 203, 313, 399/367, 379; 355/49, 51, 496, 474
See application file for complete search history.

(56) References Cited

U.S. PATENT DOCUMENTS

| | | | | |
|---|---|---|---|---|
| 6,003,861 A * | 12/1999 | Iizumi | ...................... | B42C 1/12 271/215 |
| 7,088,477 B2 * | 8/2006 | Koshimizu | ........ | H04N 1/00092 358/475 |
| 7,529,000 B2 * | 5/2009 | Ishida | ................ | H04N 1/00588 358/468 |
| 8,707,516 B2 * | 4/2014 | Koyama | ............. | H04M 1/0216 16/223 |
| 8,941,877 B2 * | 1/2015 | Osakabe | ................ | H04N 1/126 271/4.01 |
| 2006/0085946 A1 * | 4/2006 | Hattori | ............... | H04N 1/00519 16/221 |
| 2006/0139701 A1 | 6/2006 | Kurokawa et al. | | |
| 2007/0048010 A1 * | 3/2007 | Nakano | .................. | B65H 5/021 399/121 |
| 2007/0069445 A1 * | 3/2007 | Kakuta | ................ | G03G 15/605 271/3.14 |
| 2009/0261521 A1 * | 10/2009 | Okamoto | ............... | B65H 37/04 270/37 |
| 2012/0155916 A1 * | 6/2012 | Ito | ........................... | B41J 29/02 399/100 |
| 2012/0161383 A1 * | 6/2012 | Sato | ..................... | B65H 3/0669 271/10.13 |
| 2014/0002869 A1 * | 1/2014 | Takemoto | .............. | B41J 29/023 358/474 |

FOREIGN PATENT DOCUMENTS

| | | |
|---|---|---|
| JP | 2001-041226 A | 2/2001 |
| JP | 2006-186771 A | 7/2006 |
| JP | 2014-017298 A | 1/2014 |

* cited by examiner

*Primary Examiner* — Negussie Worku
(74) *Attorney, Agent, or Firm* — Workman Nydegger

(57) ABSTRACT

An image reading apparatus includes a housing; an opening/closing member that is switchable between a first position in which it covers the housing and a second position in which it uncovers the housing via pivoting about a pivot shaft; a document table that carries a document and is covered or uncovered by the opening/closing member; and a reading part that reads the document mounted on the document table. A bearing that receives the pivot shaft of the opening/closing member has a guide portion that guides the pivot shaft toward the inside of the housing when the opening/closing member is pivoted from the first position to the second position.

9 Claims, 30 Drawing Sheets

OPENING/CLOSING DEVICE THAT OPENS AND CLOSES OPENING/CLOSING MEMBER, AND IMAGE READING APPARATUS

BACKGROUND

1. Technical Field

The present invention relates to an opening/closing device that opens and closes an opening/closing member and to an image reading apparatus, such as a scanner, having the opening/closing device for the opening/closing member.

2. Related Art

Typically, scanners, serving as image reading apparatuses, in particular, so-called flat-bed scanners, which read an image with a reading sensor moving below a glass document table, have a cover that covers or uncovers the glass document table. Although some scanners use an automatic document transport device (ADF) that covers or uncovers the glass document table instead of the cover, this application will discuss an example configuration in which the cover covers or uncovers the glass document table.

JP-A-2006-186771 discloses a configuration in which a document pressing member formed of an elastic material, such as sponge, is provided on the back of a cover, i.e., a surface facing a glass document table. Hence, it is possible to uniformly press a document with the document pressing member to obtain a good reading result, when the cover is closed.

However, documents vary in thickness. In particular, book-type documents have large thicknesses. When the document is thick, although it is possible to press the document at a position near a pivot shaft of the cover, it is impossible to press the document at a position away from the pivot shaft. Hence, as disclosed in JP-A-2001-041226, some scanners are configured such that the pivot shaft of the cover (or "lid" in JP-A-2001-041226) is movable in a top-bottom direction (i.e., a direction perpendicular to the glass document table), so that the center of pivot of the cover may be moved up and down, depending on the thickness of the document.

When the cover is rotated in a direction in which it is opened from a closed state, for example, a base end (i.e., an end closer to the pivot shaft) of the cover moves to the back of the scanner. Thus, a space in which the cover pivots is needed behind the scanner. Furthermore, when the cover in a closed state is opened, the cover is pivoted from a closed state, via an upright state, until it is stopped. Hence, a large space in which the cover pivots is needed, not only behind the scanner, but also above the scanner.

SUMMARY

An advantage of some aspects of the invention is that it provides an opening/closing device that opens and closes an opening/closing member, the device requiring a small space for opening and closing the opening/closing member and being advantageous particularly when a thin medium is mounted, and provides an image reading apparatus.

An image reading apparatus according to a first aspect of the invention includes a housing; an opening/closing member that is switchable between a first position in which it covers the housing and a second position in which it uncovers the housing via pivoting about a pivot shaft; a document table that carries a document and is covered or uncovered by the opening/closing member; and a reading part that reads the document mounted on the document table.

A bearing that receives the pivot shaft of the opening/closing member has a guide portion that guides the pivot shaft toward the inside of the housing when the opening/closing member is pivoted from the first position to the second position.

With this configuration, the bearing that receives the pivot shaft of the opening/closing member has a guide portion that guides the pivot shaft toward the inside of the housing when the opening/closing member is pivoted from the first position to the second position. Hence, when the opening/closing member is pivoted from the first position to the second position, the pivot shaft enters the guide portion, allowing the base end portion (i.e., the portion on the opposite side from a free end) of the opening/closing member to pivot at a position closer to the housing. In this way, it is possible to reduce a space needed for opening and closing the opening/closing member, particularly, a space needed around the housing.

It is preferable that the guide portion have such a shape that it guides the pivot shaft downward, toward the inside of the housing. According to this aspect, because the guide portion has such a shape that it guides the pivot shaft downward, toward the inside of the housing, when the opening/closing member is pivoted from the first position to the second position, the pivot shaft is guided downward. Thus, the free end portion of the opening/closing member is pivoted at a lower position, reducing the space needed to open and close the opening/closing member, particularly, the space needed above the housing.

It is preferable that the image reading apparatus further include a movement part that moves the pivot shaft into the guide portion when the opening/closing member is pivoted from the first position to the second position.

With this configuration, because the image reading apparatus includes the movement part that moves the pivot shaft into the guide portion when the opening/closing member is pivoted from the first position to the second position, the pivot shaft is reliably moved into the guide portion when the opening/closing member is pivoted from the first position to the second position.

It is preferable that the movement part include a guiding surface extending toward the inside of the housing, and a guided portion that pivots with the pivot shaft and comes into contact with the guiding surface to be guided toward the inside of the housing when the opening/closing member is pivoted from the first position to the second position.

With this configuration, because the movement part includes a guiding surface extending toward the inside of the housing, and a guided portion that pivots with the pivot shaft and comes into contact with the guiding surface to be guided toward the inside of the housing when the opening/closing member is pivoted from the first position to the second position, the movement part may be formed in a simple and compact structure.

It is preferable that the image reading apparatus further include a restriction part that restricts movement of the pivot shaft toward the outside of the housing when the opening/closing member is pivoted from the first position to the second position.

With this configuration, because the image reading apparatus further includes a restriction part that restricts movement of the pivot shaft toward the outside of the housing when the opening/closing member is pivoted from the first position to the second position, it is possible to prevent the pivot shaft from coming off the guide portion when the opening/closing member is pivoted from the first position to the second position.

It is preferable that the second position of the opening/closing member be maintained by contact between the pivot shaft and an inner upper part of the guide portion.

With this configuration, because the second position of the opening/closing member is maintained by contact between the pivot shaft and an inner upper part of the guide portion, the part for maintaining the second position is formed at low cost.

It is preferable that the image reading apparatus further include a fulcrum portion that pivots with the pivot shaft, and a fulcrum support portion with which the fulcrum portion comes into contact when the opening/closing member is pivoted from the first position to the second position. The contact between the pivot shaft and the inner upper part of the guide portion is achieved by upward displacement of the pivot shaft caused by pivoting of the opening/closing member about the fulcrum portion.

With this configuration, because the contact between the pivot shaft and the inner upper part of the guide portion is achieved by upward displacement of the pivot shaft caused by pivoting of the opening/closing member about the fulcrum portion, it is possible to make the pivot shaft reliably come into contact with the inner upper part of the guide portion.

It is preferable that the movement part include a guiding surface extending toward the inside of the housing, and a projection provided on the pivot shaft and coming into contact with the guiding surface to guide the pivot shaft toward the inside of the housing when the opening/closing member is pivoted from the first position to the second position.

With this configuration, because the movement part includes a guiding surface extending toward the inside of the housing, and a projection provided on the pivot shaft and coming into contact with the guiding surface to guide the pivot shaft toward the inside of the housing when the opening/closing member is pivoted from the first position to the second position, the movement part can be formed in a simple structure and at low cost.

An opening/closing device that opens and closes an opening/closing member according to a second aspect of the invention includes a housing, and an opening/closing member that is switchable between a first position in which it covers the housing and a second position in which it uncovers the housing via pivoting about a pivot shaft. A bearing that receives the pivot shaft of the opening/closing member has a guide portion that guides the pivot shaft toward the inside of the housing when the opening/closing member is pivoted from the first position to the second position. The guide portion has such a shape that it guides the pivot shaft downward, toward the inside of the housing. A movement part that moves the pivot shaft into the guide portion when the opening/closing member is pivoted from the first position to the second position is provided. With this configuration, it is possible to obtain an opening/closing device having the same advantages as the first aspect.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
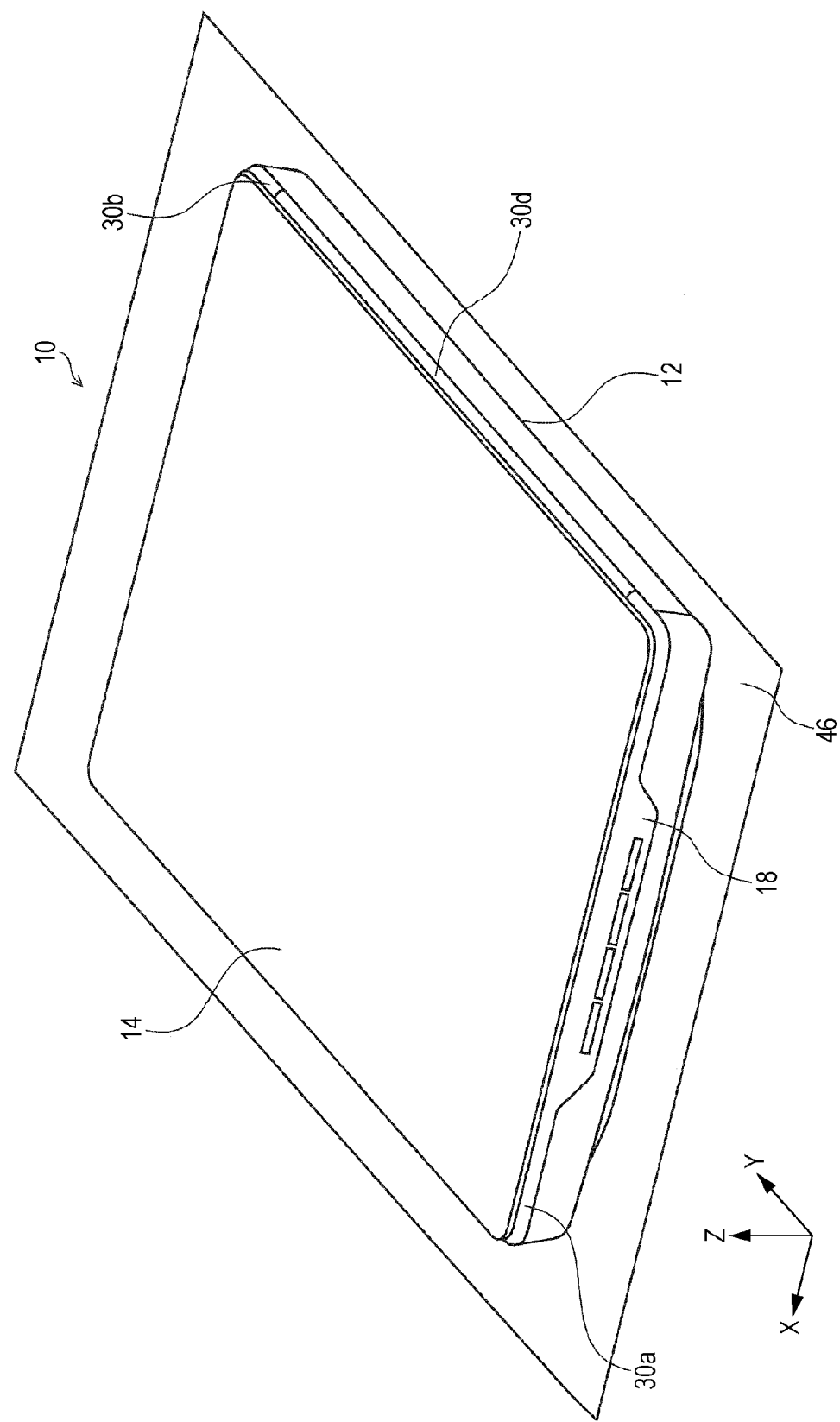
FIG. 1 is an external perspective view of an image reading apparatus of the invention, showing a state in which an opening/closing member is closed.

Embodiments of the invention will be described below with reference to the drawings. Note that the same components are denoted by the same reference numerals throughout the embodiments. These components will be described only in the first embodiment and will not be described in the subsequent embodiments.

Each drawing contains an X-Y-Z coordinate system. The X direction corresponds to a scanning direction of an image reading unit and to the width direction, the Y direction corresponds to a direction in which the image reading unit moves and to the depth direction, and the Z direction corresponds to a direction perpendicular to a document mounting surface. Herein, the +Y-axis direction corresponds to a direction toward the rear side, the −Y-axis direction corresponds to a direction toward the front side or toward the inside of a housing, the +Z-axis direction corresponds to the upper side, and the −Z-axis direction corresponds to the lower side.

Outline of Image Reading Apparatus

Referring to FIGS. 1 to 6, an image reading apparatus 10 will be described. The image reading apparatus 10 includes a housing 12; a cover 14, serving as an "opening/closing member"; a document table 16; a controller 18; a guide portion 20; a driving mechanism 22; an image reading unit 24, serving as a "reading part"; and a stand 26.

Figure 2:
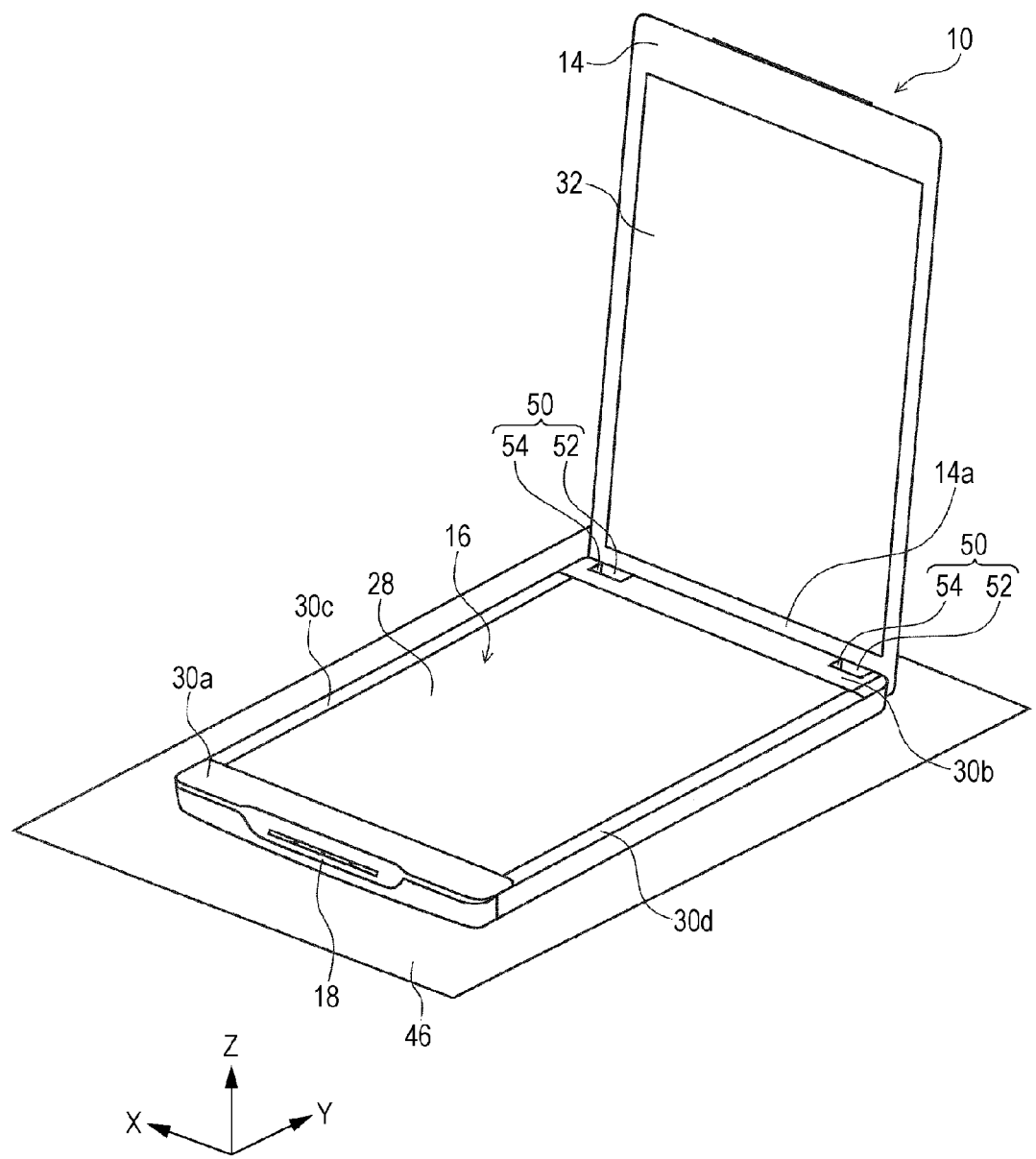
FIG. 2 is an external perspective view of the image reading apparatus, showing a state in which the opening/closing member is open.

As shown in FIG. 2, the document table 16 is provided at the top of the housing 12. The document table 16 includes a document mounting surface 28; a front frame 30a, a rear frame 30b, and side frames 30c and 30d surrounding the document mounting surface 28. These frames 30a, 30b, 30c, and 30d form the periphery of the document mounting surface 28.

In this embodiment, the document mounting surface 28 is formed of a flat and transparent glass plate, on which a document having an image to be read can be mounted. That is, the document mounting surface 28 forms a reading area in which the image reading unit 24 can read a medium.

The housing 12 has the controller 18 in the front side. The controller 18 includes a power switch, change settings buttons, etc., for controlling the image reading apparatus 10.

The cover 14 is attached to the rear end of the housing 12 so as to be pivotable relative to the housing 12. The cover 14 is switchable between a first position in which it covers the document table 16, as shown in FIG. 1, and a second position in which it uncovers the document table 16, as shown in FIG. 2. The cover 14 has a document pressing member 32 on a surface facing the document table 16. The document pressing member 32 is formed of an elastic member, such as sponge.

When the cover 14 is in the first position in which it covers the document table 16 (see FIG. 1), the document pressing member 32 uniformly presses a document mounted on the document mounting surface 28 of the document table 16 from a surface opposite to a reading surface of the document. As a result, the reading surface of the document pressed by the document pressing member 32 is brought into a close contact with the document mounting surface 28. In this way, the document pressing member 32 prevents the document from floating up from the document mounting surface 28. Note that the document pressing member 32 has substantially the same size as the document mounting surface 28, so that it can press the entirety of the document mounted on the document mounting surface 28 from the surface opposite to the surface facing the document mounting surface 28.

Figure 3:
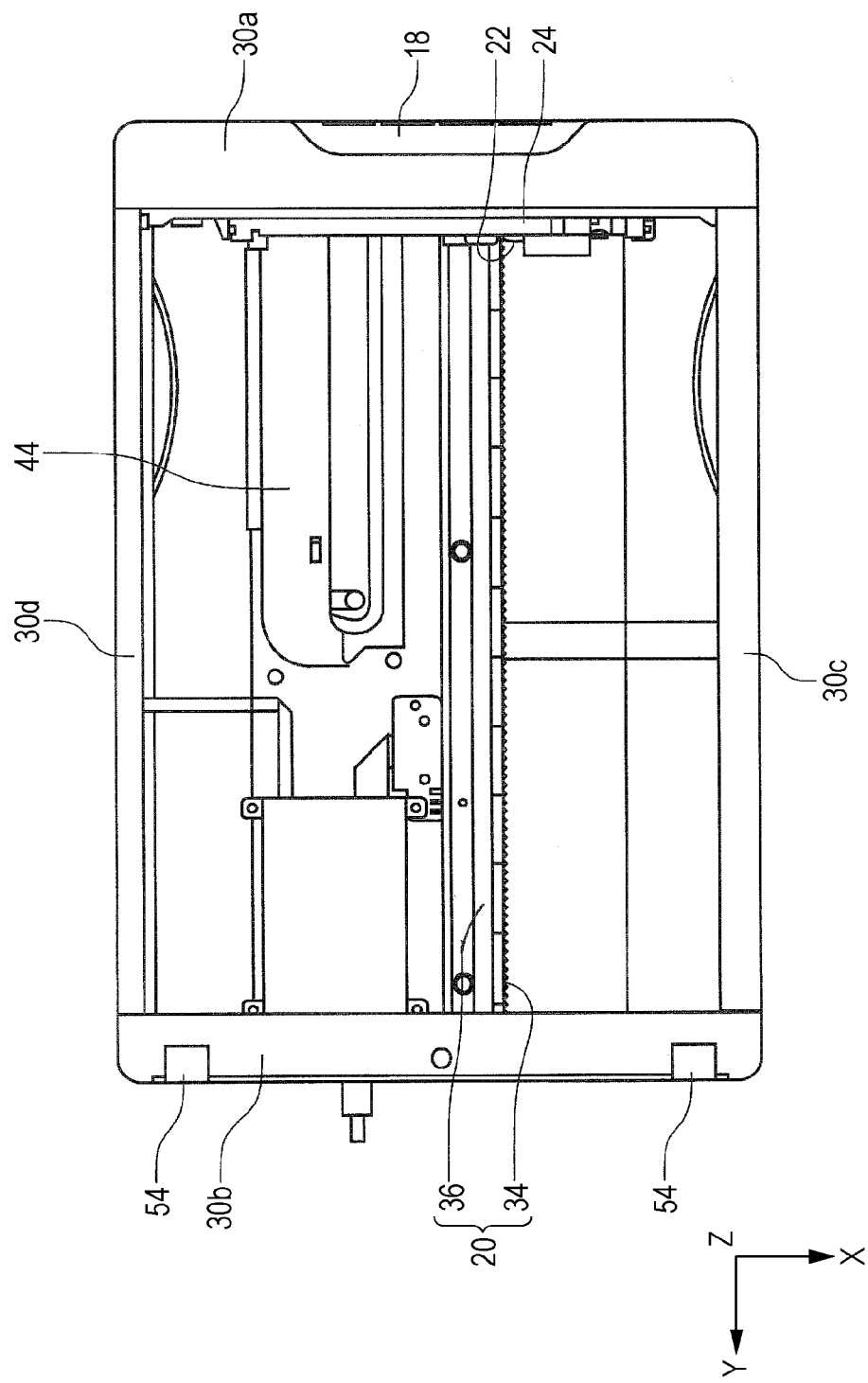
FIG. 3 is a plan view showing the structure inside a housing of the image reading apparatus, as viewed from a document mounting surface.
Figure 4:
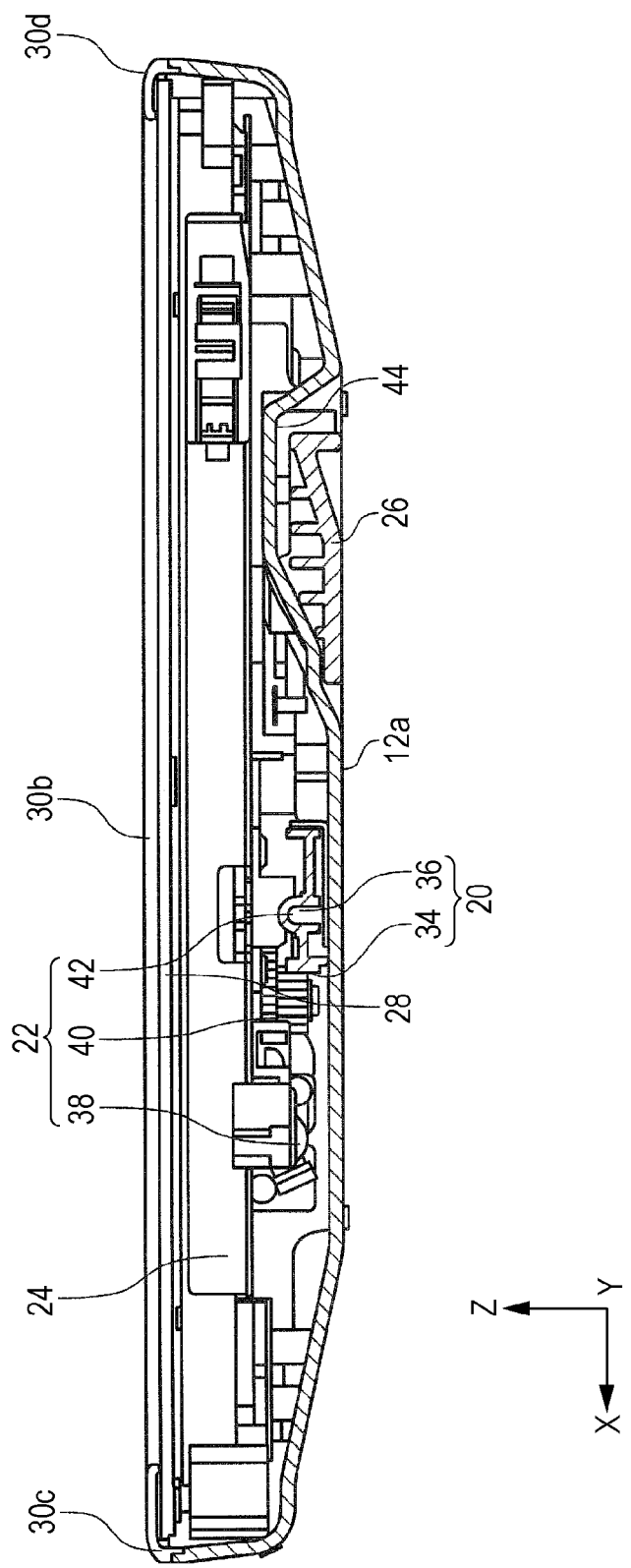
FIG. 4 is a vertical sectional view of the housing of the image reading apparatus.

As shown in FIG. 3, the guide portion 20 extending from the front side to the rear side in the depth direction is provided in the housing 12. The guide portion 20 has a rack 34 formed on a side surface on the +X side in FIG. 3. Furthermore, as shown in FIG. 4, the guide portion 20 has a projecting portion 36 extending in the depth direction, on the top surface thereof.

The driving mechanism 22 and the image reading unit 24 are attached to the guide portion 20 so as to be able to reciprocate in the depth direction. The driving mechanism 22 includes a driving motor 38, a pinion gear 40, and a recessed portion 42. The driving motor 38 transmits a driving force to the pinion gear 40 via a plurality of gears. The pinion gear 40 is in mesh with the rack 34 of the guide portion 20. That is, the rack 34 and the pinion gear 40 form a rack and pinion mechanism.

The recessed portion 42 (see FIG. 4) receives the projecting portion 36 of the guide portion 20. As shown in FIG. 4, the image reading unit 24 is attached to the top of the driving mechanism 22 in a direction perpendicular to the document mounting surface 28. The image reading unit 24 is formed as an optical unit that reads information of the document by illuminating a document mounted on the document mounting surface 28, which is located above the image reading unit 24 in the direction perpendicular to the document mounting surface 28, and receiving the reflected light. The image reading unit 24 extends in the width direction and has substantially the same length as the document mounting surface 28 in the width direction.

When the driving motor 38 of the driving mechanism 22 is driven, the driving force is transmitted to the pinion gear 40. Then, the driving mechanism 22 moves the image reading unit 24 in the depth direction, along the projecting portion 36 of the guide portion 20, enabling the image reading unit 24 to read information, such as an image, on the reading surface of the document mounted on the document mounting surface 28.

Figure 5:
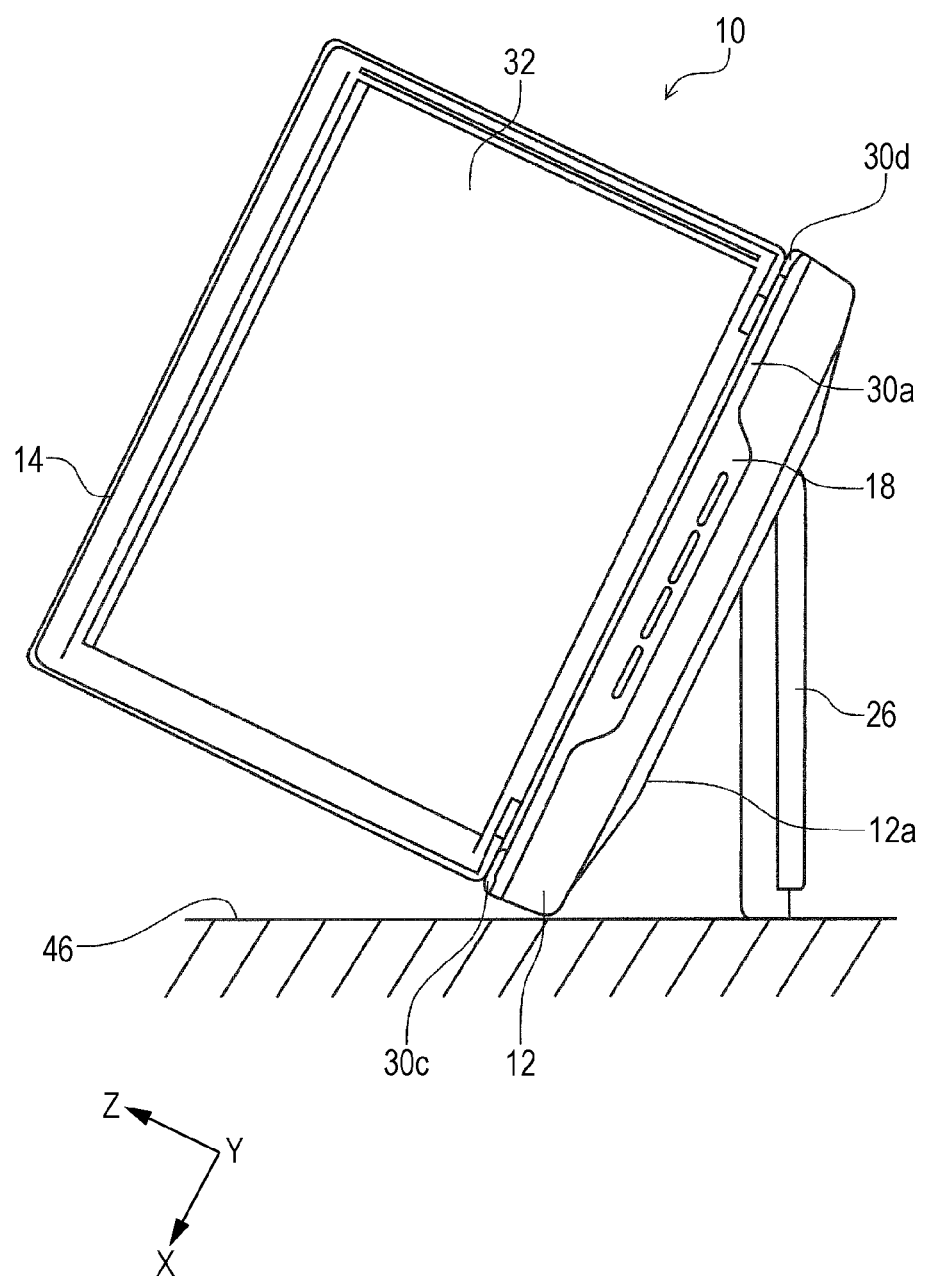
FIG. 5 is a perspective view of the image reading apparatus in an inclined position.

Furthermore, as shown in FIG. 4, the housing 12 has an accommodation portion 44 in the back. The accommodation portion 44 accommodates the stand 26. The stand 26 is switchable between a state in which it is accommodated in the accommodation portion 44 and a state in which it is pulled out of the accommodation portion 44 and is at an angle with respect to a back 12a of the housing 12, as shown in FIG. 5. The stand 26 serves to hold the housing 12 in an inclined position.

Figure 6:
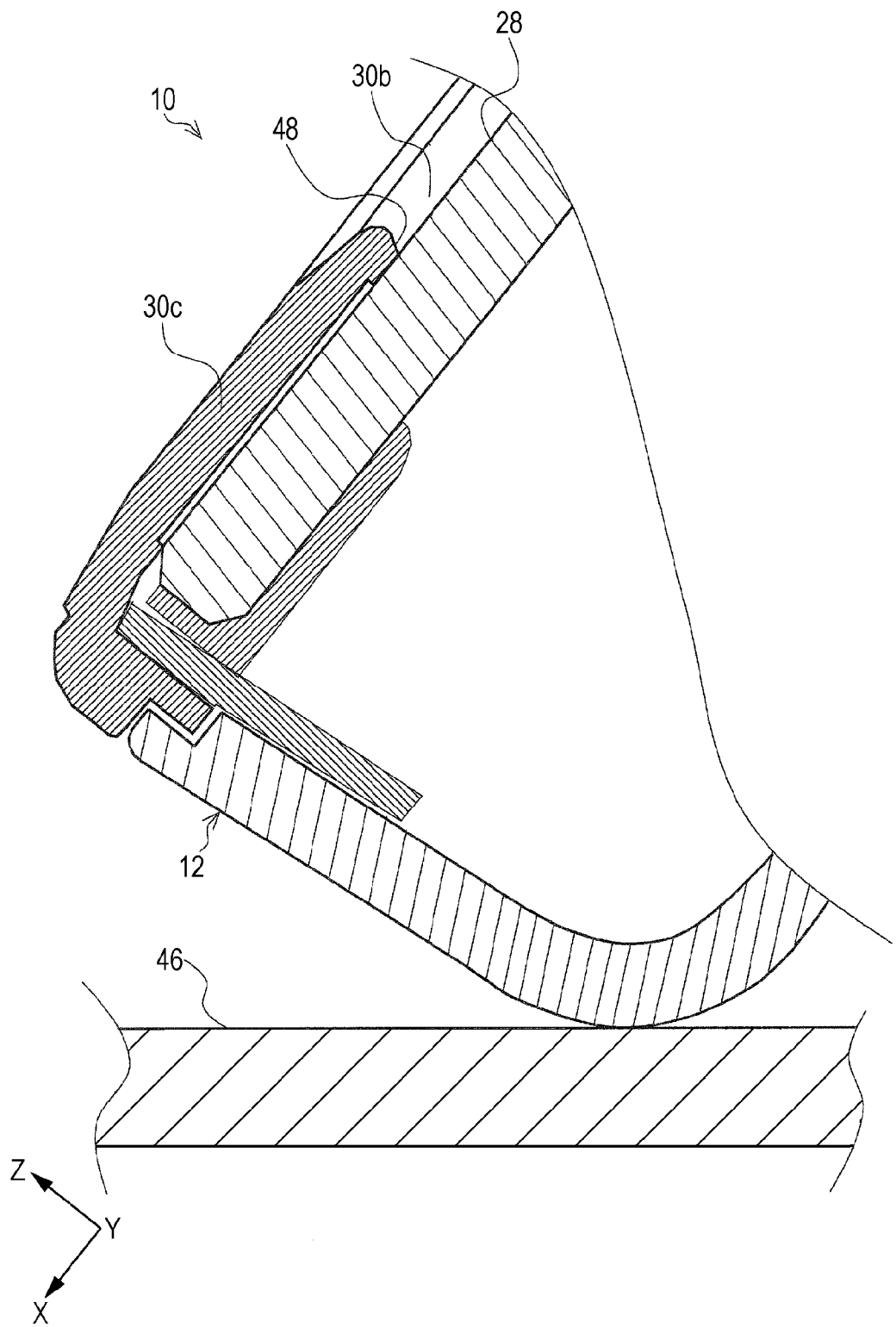
FIG. 6 is a sectional view of an end of the housing that is in contact with an installation surface when the housing is inclined.
Figure 7:
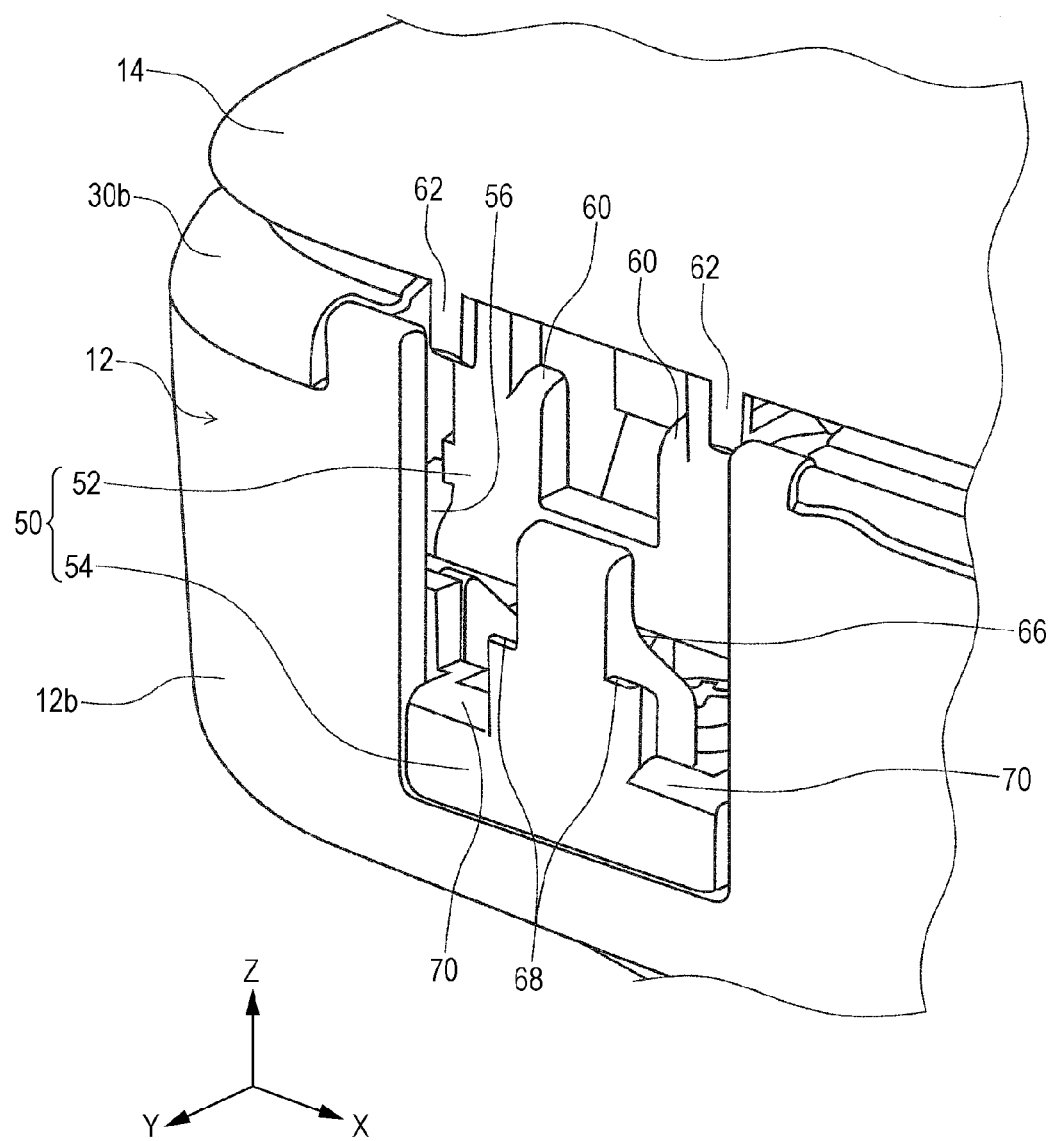
FIG. 7 is a perspective view of a cover opening/closing device provided on the rear end of the housing.

FIG. 6 shows a lower end, in an inclination direction, of the housing 12 when the housing 12 is inclined with respect to an installation surface 46 (see FIG. 5). When the housing 12 is inclined, the side frame 30c is located on the lower side, in the inclination direction, of the document table 16. The side frame 30c has a guide surface 48 at a portion adjoining the document mounting surface 28. The guide surface 48 is provided at an angle with respect to the direction perpendicular to the document mounting surface 28. More specifically, the guide surface 48 is inclined such that the portion closer to the document mounting surface 28 is located closer to the outside of the housing 12.

When a document is mounted on the document mounting surface 28 of the housing 12 that is inclined, as shown in FIG. 6, the lower end of the document in the inclination direction comes into contact with the guide surface 48. Furthermore, the lower end of the document in the inclination direction is guided by the guide surface 48 toward the document mounting surface 28. Hence, it is possible to mount a document on the document mounting surface 28 of the image reading apparatus 10 and to read an image and information thereof, even when the housing 12 is in an inclined position (see FIG. 5). That is, the image reading apparatus 10 may be used when it is inclined by the stand 26.

The image reading apparatus 10 according to this embodiment is used or stored either in a horizontal position, as shown in FIGS. 1 and 2, in which the back 12a of the housing 12 is in contact with the installation surface 46 or in an inclined position, as shown in FIG. 5, in which the housing 12 is inclined with respect to the installation surface 46.

First Embodiment

Outline of Opening/Closing Device for Cover

Referring to FIGS. 7 to 11B, opening/closing devices 50 that open and close the cover 14 will be described. The opening/closing devices 50 each include a pivot shaft portion 52, serving as a "movable portion", provided at a base end, i.e., rear end, of the cover 14; and a bearing portion 54, serving as a "fixed portion", provided at a rear end of the housing 12. The bearing portion 54 receives the pivot shaft portion 52 in a pivotable manner.

Figure 8A:
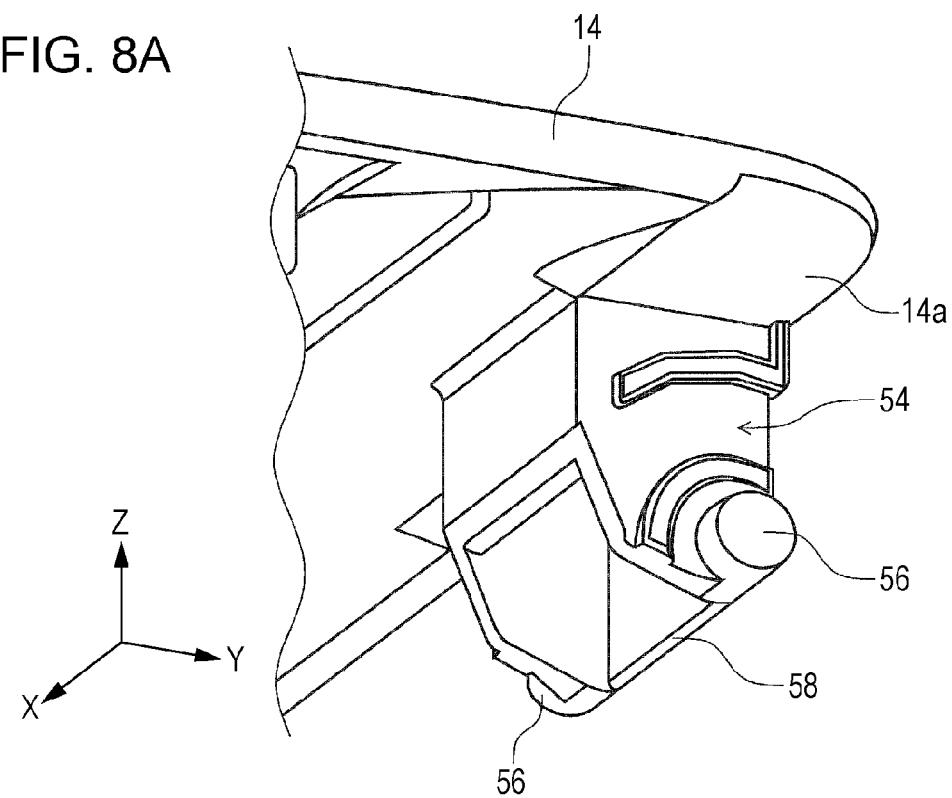
FIGS. 8A and 8B are perspective views of a pivot shaft portion of the cover, as viewed from the front side and the rear side, respectively.
Figure 8B:
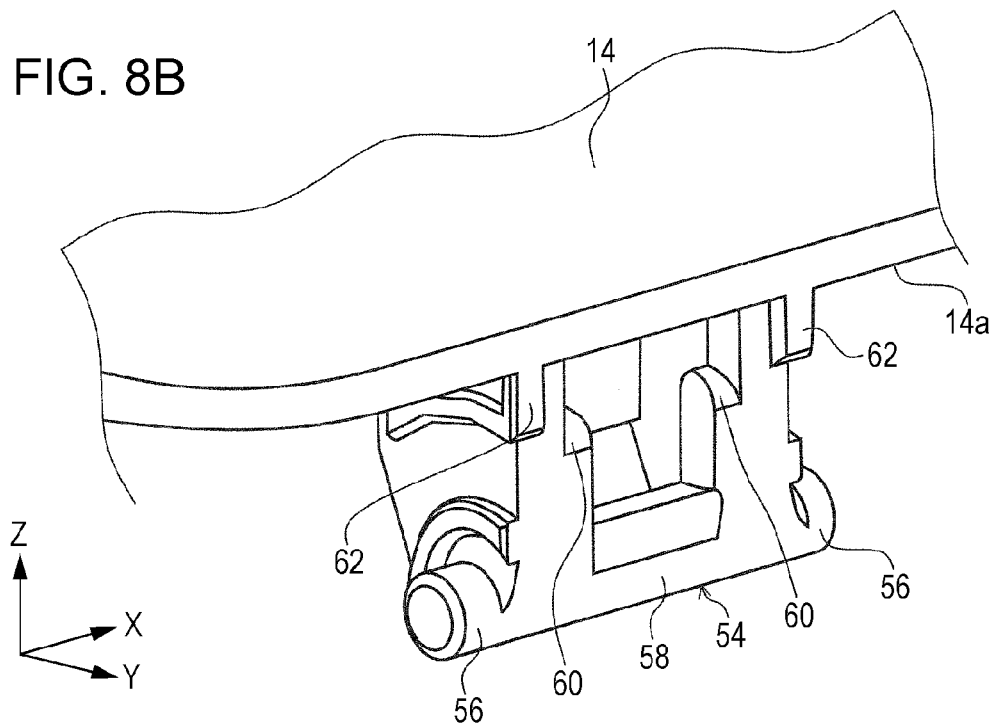

Referring to FIGS. 8A and 8B, the pivot shaft portion 52 includes a pair of pivot shafts 56 that project in the width direction from the widthwise ends of the pivot shaft portion 52. The pivot shaft portion 52 also includes a guided portion 58, restricted portions 60, and fulcrum portions 62.

Figure 9:
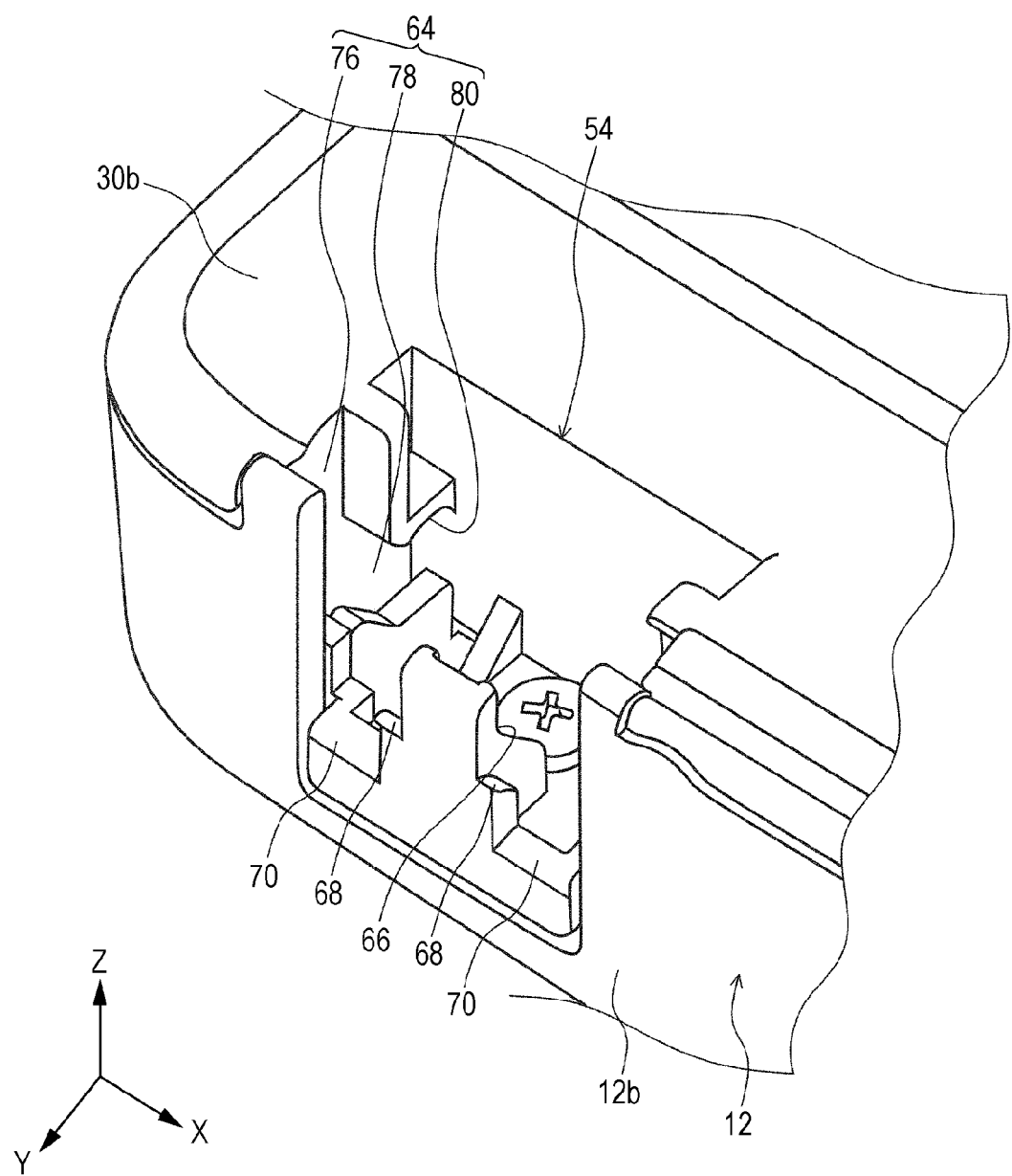
FIG. 9 is a perspective view of a bearing portion provided at the rear end of the housing.

Referring to FIG. 9, the bearing portion 54 includes a bearing 64, a guiding surface 66, restricting portions 68, and fulcrum support portions 70. In this embodiment, the guided portion 58 of the pivot shaft portion 52 and the guiding surface 66 of the bearing portion 54 form a movement part 72 (see FIG. 10B), and the restricted portions 60 of the pivot shaft portion 52 and the restricting portions 68 of the bearing portion 54 form a restriction part 74 (see FIG. 11A). In this embodiment, the bearing 64 constituting the bearing portion 54 (fixed portion) is formed of the housing 12 and the rear frame 30b, and the guiding surface 66, the restricting portions 68, and the fulcrum support portions 70 are formed of the rear frame 30b.

Referring to FIGS. 10A to 23B, the configuration and operation of the pivot shafts 56, bearing 64, movement part 72, restriction part 74, fulcrum portions 62, and fulcrum support portions 70 when the cover 14 is pivoted relative to the housing 12 will be described below. Note that FIGS. 10A, 12A, 14A, 16A, 18A, 20A, and 22A show the relationship between the pivot shafts 56 and the bearing 64 at pivot angles of 0°, 30°, 60°, 80°, 90°, 95°, and 100°, respectively, and FIGS. 10B, 12B, 14B, 16B, 18B, 20B, and 22B show the relationship between the guided portion 58 and the guiding surface 66 of the movement part 72 at pivot angles of 0°, 30°, 60°, 80°, 90°, 95°, and 100°, respectively.

Furthermore, FIGS. 11A, 13A, 15A, 17A, 19A, 21, and 23A show the relationship between the restricted portions 60 and the restricting portions 68 of the restriction part 74 at pivot angles of 0°, 30°, 60°, 80°, 90°, 95°, and 100°, respectively, and FIGS. 11B, 13B, 15B, 17B, 19B and 23B show the relationship between the fulcrum portions 62 and the fulcrum support portions 70 at pivot angles of 0°, 30°, 60°, 80°, 90°, 95°, and 100°, respectively.

In this embodiment, when the cover 14 is in the first position (closed), the pivot angle is 0°, and when the cover 14 is in the second position (open), the pivot angle is 100°. Note that the pivot angles of the cover 14 shown in the drawings are examples and may be different in actuality, depending on the manufacturing precision of the parts and the assembling precision of the device. For ease of explanation, although specific pivot angles will be presented to explain changes of the state, such changes of the state do not necessarily occur immediately when such pivot angles are reached.

Pivot Shaft and Bearing

Figure 10A:
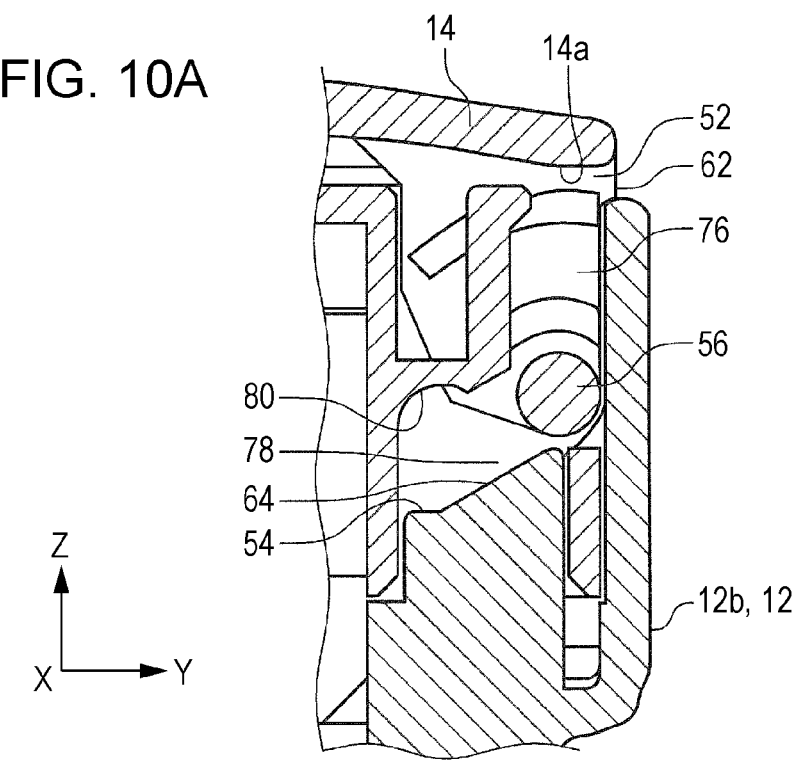
FIGS. 10A and 10B show the states of the pivot shaft and the movement part, respectively, when the pivot angle is 0°.

As shown in FIG. 10A, the bearing 64 includes a displacement allowance portion 76, a guide portion 78, and a retaining portion 80 formed in the guide portion 78. The bearing 64 receives the pivot shafts 56. When the pivot shafts 56 are located in the displacement allowance portion 76, the pivot shafts 56 (i.e., the cover 14) may be displaced relative to the housing 12, in a direction intersecting (in this embodiment, perpendicular to (i.e., in the Z-axis direction)) the document mounting surface 28.

Furthermore, the guide portion 78 communicates with the displacement allowance portion 76. The guide portion 78 is inclined downward in a direction intersecting the document mounting surface 28, toward the inside of the housing 12, from a rear side 12b of the housing 12, in the depth direction. Furthermore, the retaining portion 80 capable of retaining the pivot shafts 56 is formed at the inner upper end of the guide portion 78.

Now, referring to FIGS. 10A, 12A, 14A, 16A, 18A, 20A, and 22A, the pivot shafts 56 are located at the bottom of the displacement allowance portion 76 when the cover 14 is in the first position relative to the housing 12. When the cover 14 starts to be pivoted clockwise in FIG. 10A from the first position (pivot angle 0°) relative to the housing 12, the pivot shafts 56 starts to be displaced downward, toward the inside of the housing 12, along the guide portion 78, from the bottom of the displacement allowance portion 76 by the movement part 72 (described in detail below) (see FIGS. 10A, 12A, 14A, and 16A).

That is, the pivot shafts 56 are guided downward, toward the inside of the housing 12, from the rear side of the housing 12, by the guide portion 78. Then, when the pivot angle of the cover 14 relative to the housing 12 has reached 90°, the pivot shafts 56 are located at the inner end of the guide portion 78 (see FIG. 18A). When the pivot shafts 56 start to be rotated from the first to the second position, the pivot shafts 56 move from the displacement allowance portion 76 to the guide portion 78 and become unable to move up or down along the displacement allowance portion 76.

Figure 20A:
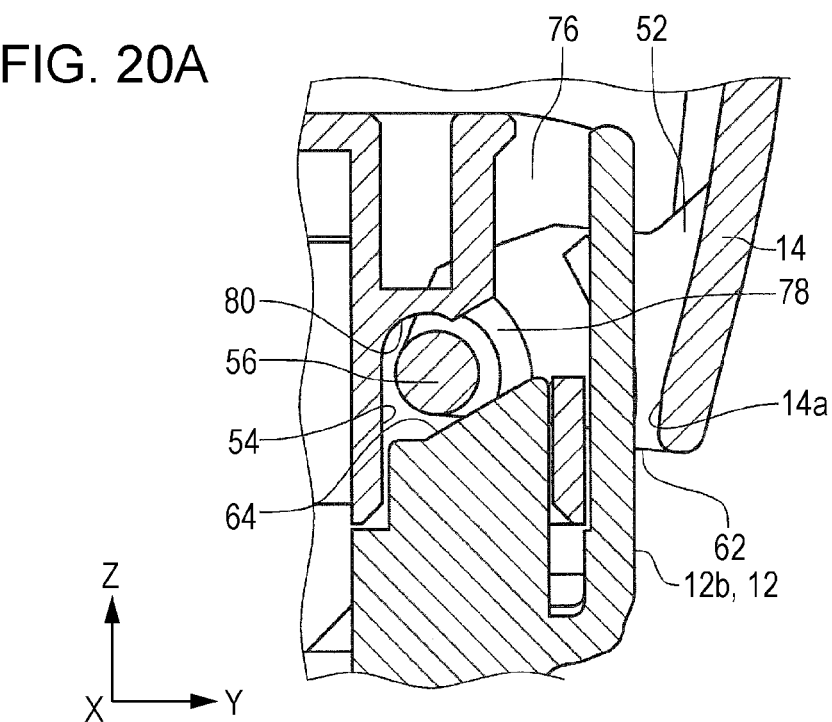
FIGS. 20A and 20B show the states of the pivot shaft and the movement part, respectively, when the pivot angle is 95°.
Figure 20B:
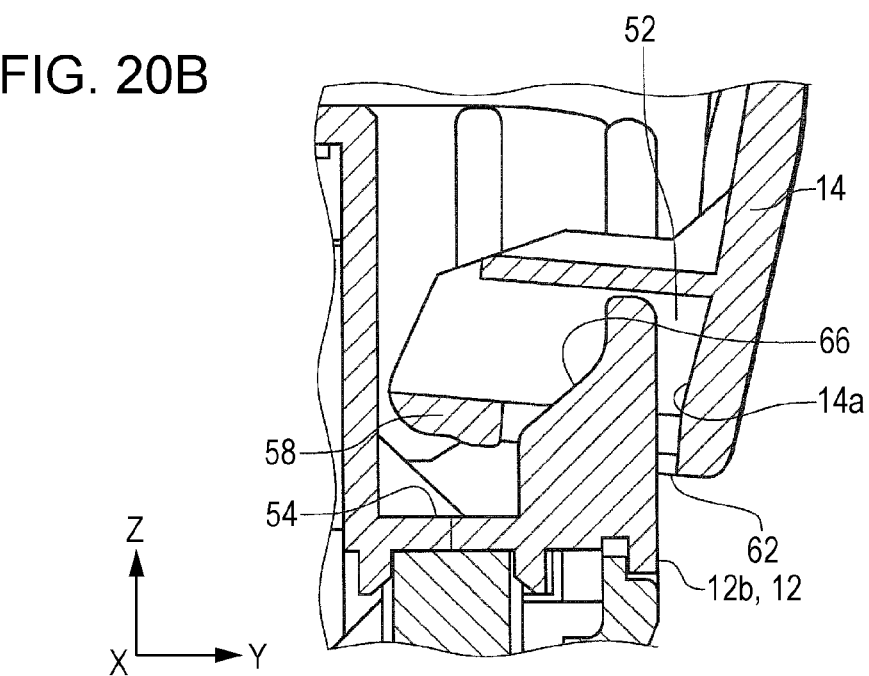

Furthermore, when the cover 14 is pivoted to a pivot angle of 90° or more relative to the housing 12, the pivot shafts 56 start to be displaced upward in a direction intersecting the document mounting surface 28, at the inner end of the guide portion 78 (see FIG. 20A). More specifically, when the pivot angle of the cover 14 relative to the housing 12 is between 90° and 110°, the cover 14 is pivoted relative to the housing 12 about a contact portions between the fulcrum portions 62 and the fulcrum support portions 70, serving as a center of pivot. Once the pivot angle of the cover 14 relative to the housing 12 has reached 110°, the pivot shafts 56 are retained by the retaining portion 80 in the guide portion 78 (see FIG. 22A).

Movement Part

Next, the movement part 72 will be described.

Figure 10B:
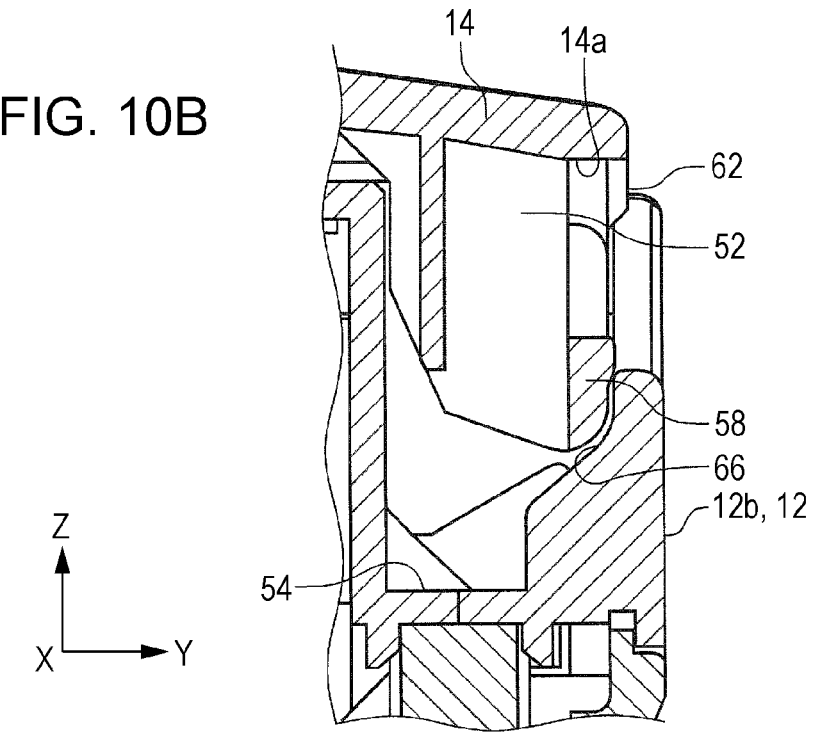

Referring to FIG. 10B, the guiding surface 66 constituting the movement part 72 is provided in the middle of the bearing portion 54 in the width direction. The guiding surface 66 is formed as an inclined surface extending toward the front side (inside) of the housing 12 in the depth direction from the rear side and extending downward in the height direction.

Furthermore, the guided portion 58 is provided at the lower end of the pivot shaft portion 52, in the middle in the width direction. When the pivot shaft portion 52 is attached to the bearing portion 54, the guided portion 58 faces the guiding surface 66. Furthermore, as shown in FIG. 10B, the guided portion 58 has a curved surface mating with the guiding surface 66.

Referring to FIGS. 10B, 12B, 14B, 16B, 18B, 20B, and 22B, when the cover 14 starts to be pivoted clockwise in FIG. 10B from the first position (pivot angle 0°) relative to the housing 12, the guided portion 58 pivots along the guiding surface 66 and is displaced from the rear side of the housing 12 toward the inside of the housing 12 (see FIGS. 10B, 12B, 14B, and 16B). When the pivot angle of the cover 14 relative to the housing 12 has exceeded 80°, the guided portion 58 is separated from the guiding surface 66 and is further displaced toward the inside of the housing 12 (see FIGS. 18B, 20B, and 22B).

That is, because the movement part 72 is configured such that the guiding surface 66 guides the guided portion 58 from the rear side of the housing 12 toward the inside of the housing 12, when the cover 14 is pivoted relative to the housing 12, it is possible to displace the pivot shafts 56 from the rear side toward the inside of the housing 12, as the cover 14 is pivoted relative to the housing 12.

Restriction Part

Now, the restriction part 74 will be described. The restriction part 74 inhibits the pivot shafts 56 moved from the rear side of the housing 12 toward the inside of the housing 12 from moving back toward the rear side (outside) of the housing 12 when the pivot angle of the cover 14 relative to the housing 12 has exceeded 90°.

As shown in FIG. 8B, the restricted portions 60 are disposed on both sides, in the width direction, of the guided portion 58 in the pivot shaft portion 52. The restricted portions 60 are located to the +Z-axis direction side of the guided portion 58 (i.e., near the upper end of the pivot shaft portion 52) in the Z-axis direction in FIG. 8B.

Figure 11A:
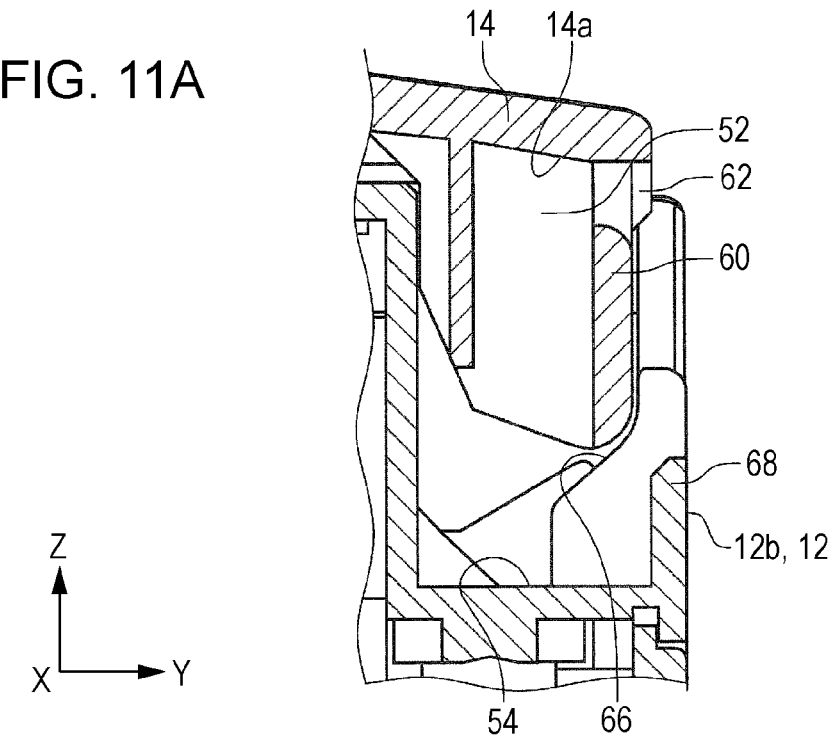
FIGS. 11A and 11B show the states of the restriction part and the fulcrum portion, respectively, when the pivot angle is 0°.

Referring to FIGS. 11A, 13A, 15A, 17A, 19A, 21, and 23A, as the cover 14 is pivoted relative to the housing 12, the restricted portions 60 are rotated clockwise in FIG. 11A toward the restricting portions 68. When the pivot angle of the cover 14 relative to the housing 12 has exceeded 80° (see FIG. 17A), the restricted portions 60 are located on the inner side (i.e., closer to the front side) of the housing 12, in the depth direction, than the restricting portions 68.

Figure 19A:
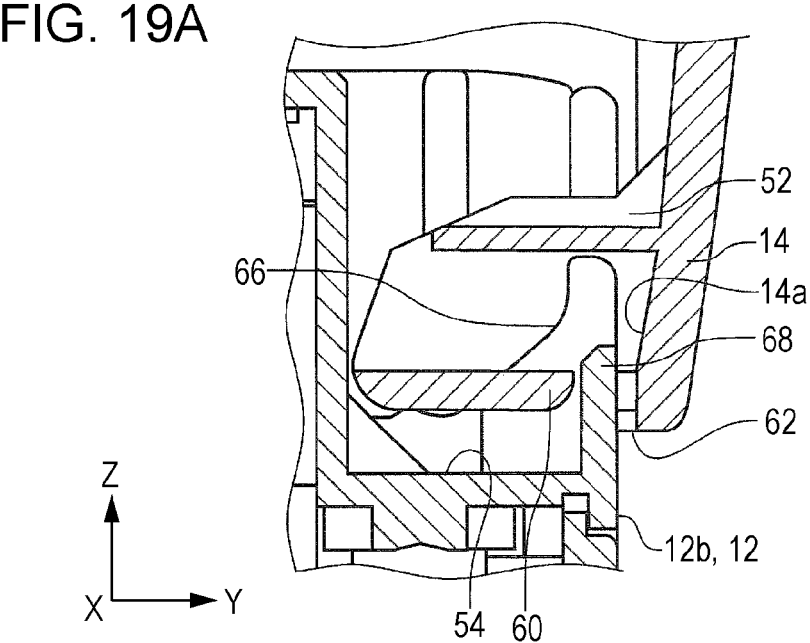
FIGS. 19A and 19B show the states of the restriction part and the fulcrum portion, respectively, when the pivot angle is 90°.
Figure 19B:
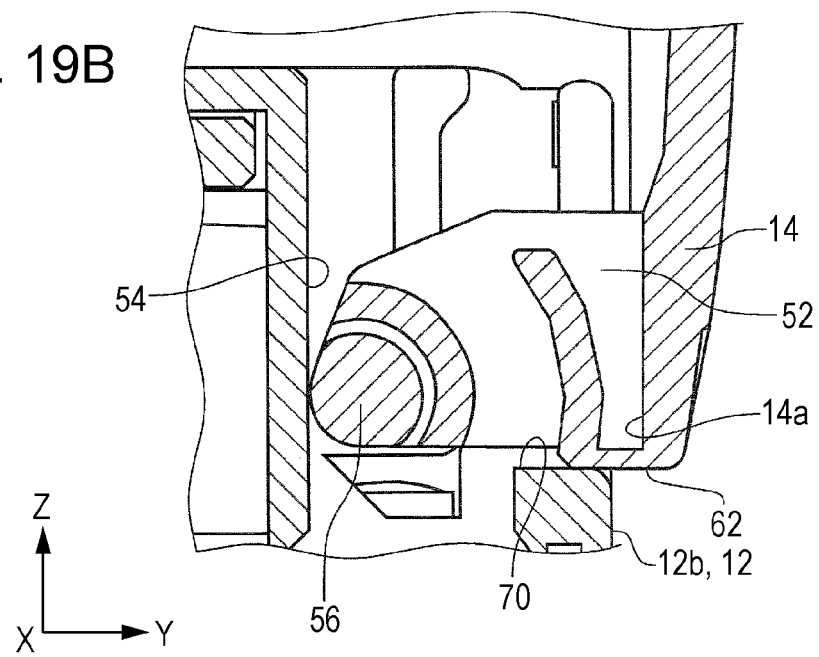
Figure 21:
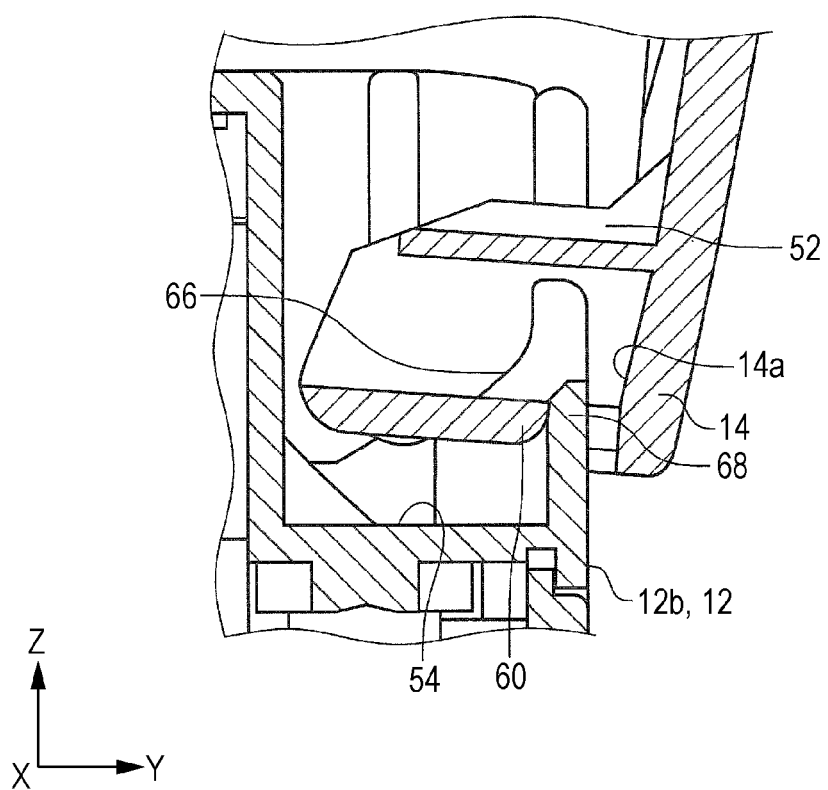
FIG. 21 shows the state of the restriction part when the pivot angle is 95°.
Figure 23A:
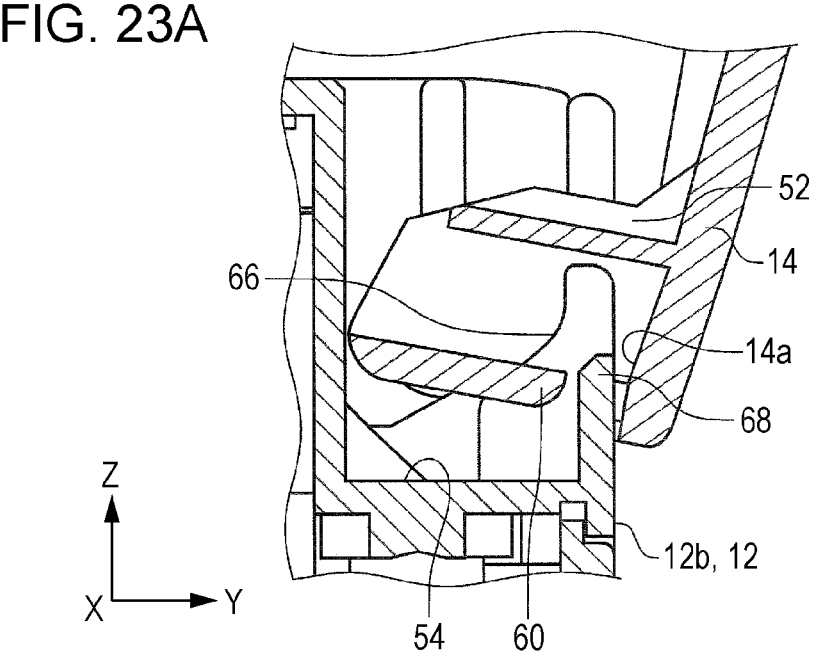
FIGS. 23A and 23B show the states of the restriction part and the fulcrum portion, respectively, when the pivot angle is 100°.
Figure 23B:
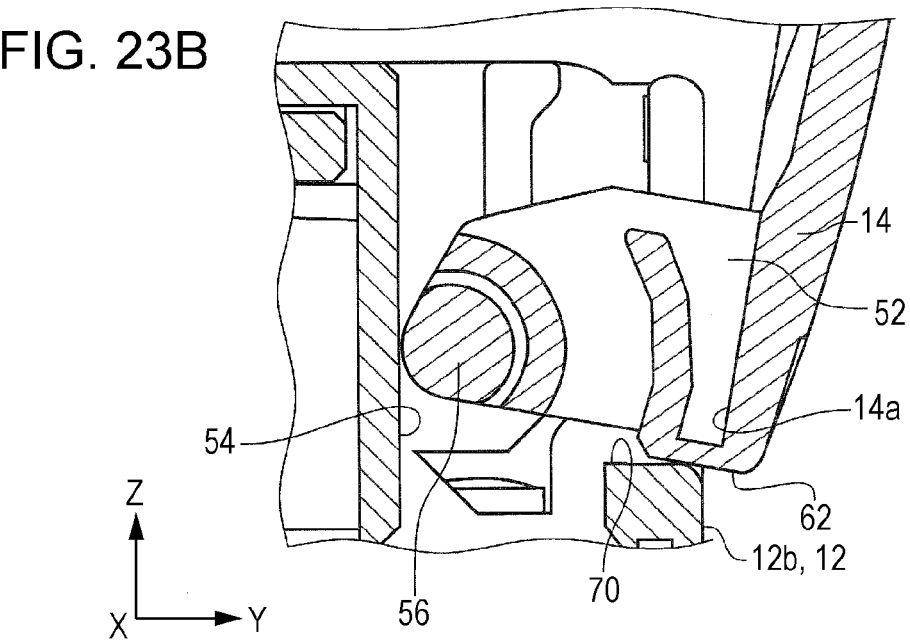

As shown in FIGS. 19A, 21, and 23A, when the pivot angle of the cover 14 relative to the housing 12 has exceeded 90° (see FIG. 21), the cover 14 tends to move toward the rear side due to its own weight. At this time, the pivot shafts 56 also tend to move from the inside toward the outside of the housing 12, within the guide portion 78.

Due to this movement, the restricted portions 60 come into contact with the restricting portions 68. In this way, the restricting portions 68 restrict the movement of the restricted portions 60 from the inside toward the outside of the housing 12. Hence, the movement of the pivot shafts 56 from the inside toward the outside of the housing 12 is restricted. That is, the restriction part 74 prevents the pivot shafts 56 from coming off the guide portion 78.

Fulcrum Portions and Fulcrum Support Portions

Now, the fulcrum portions 62 and the fulcrum support portions 70 will be described. The fulcrum portions 62 are provided at the upper end of the pivot shaft portion 52. The fulcrum portions 62 are disposed between the restricted portions 60 and the pivot shafts 56 in the width direction. Furthermore, the fulcrum portions 62 project further toward the rear side in the depth direction than the pivot shaft portion 52 and are flush with the rear end face of the cover 14.

As shown in FIG. 9, the fulcrum support portions 70 of the bearing portion 54 are located below the guiding surface 66 and the restricting portions 68 in a direction intersecting the document mounting surface 28. The fulcrum support portions 70 are formed in a substantially flat shape in the depth direction.

Figure 11B:
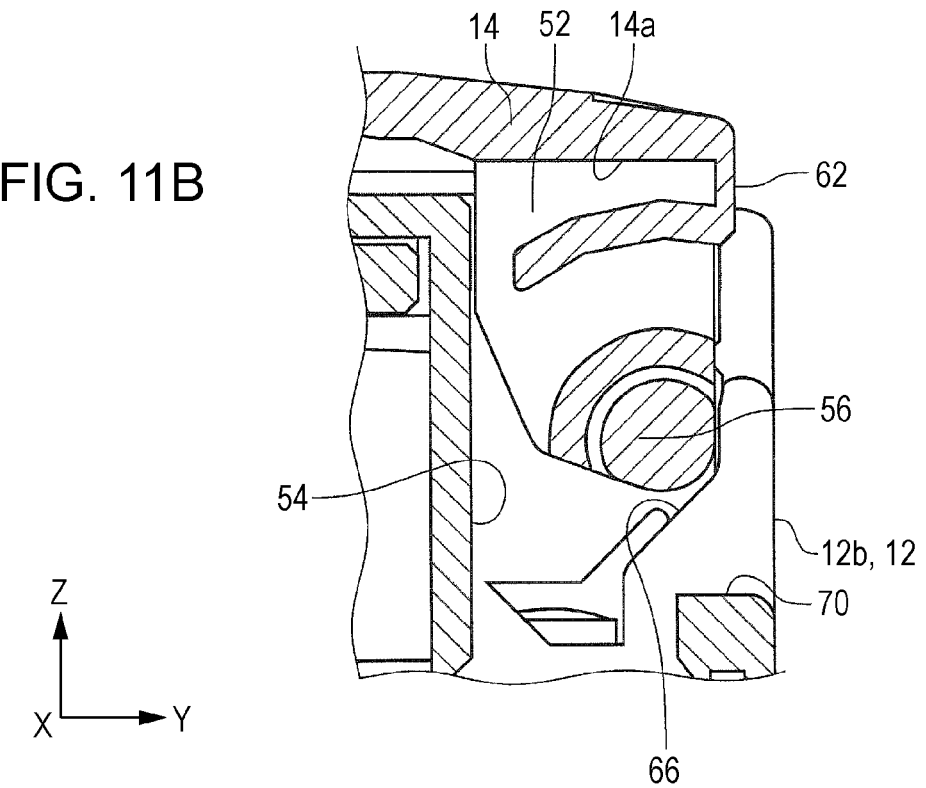
Figure 12A:
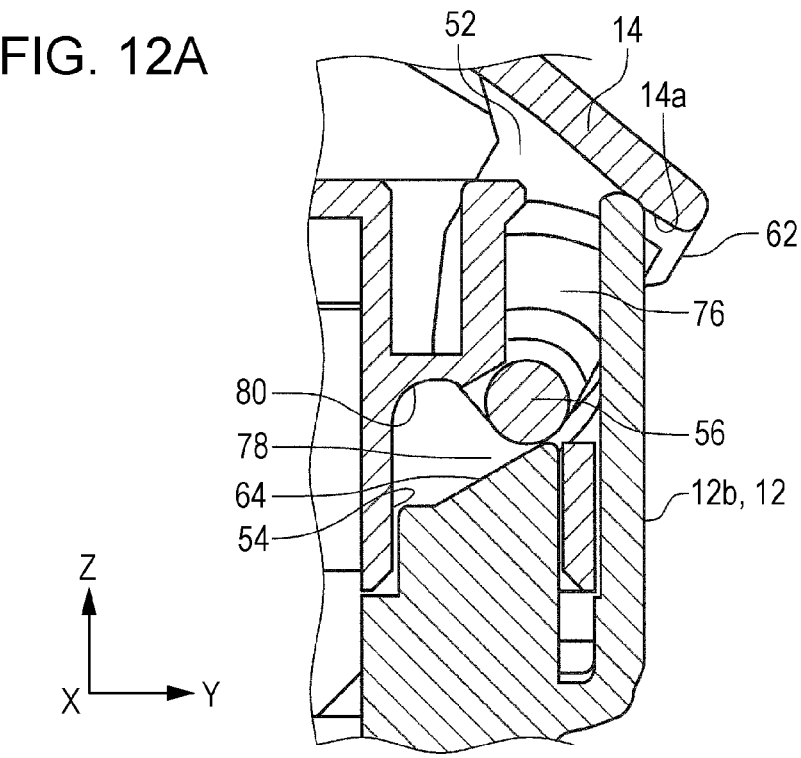
FIGS. 12A and 12B show the states of the pivot shaft and the movement part, respectively, when the pivot angle is 30°.
Figure 12B:
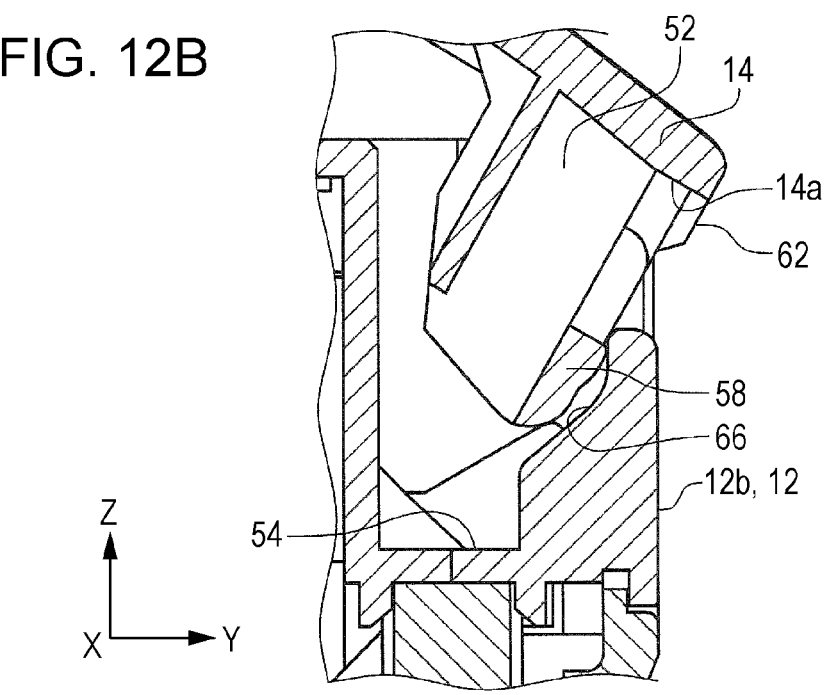
Figure 13A:
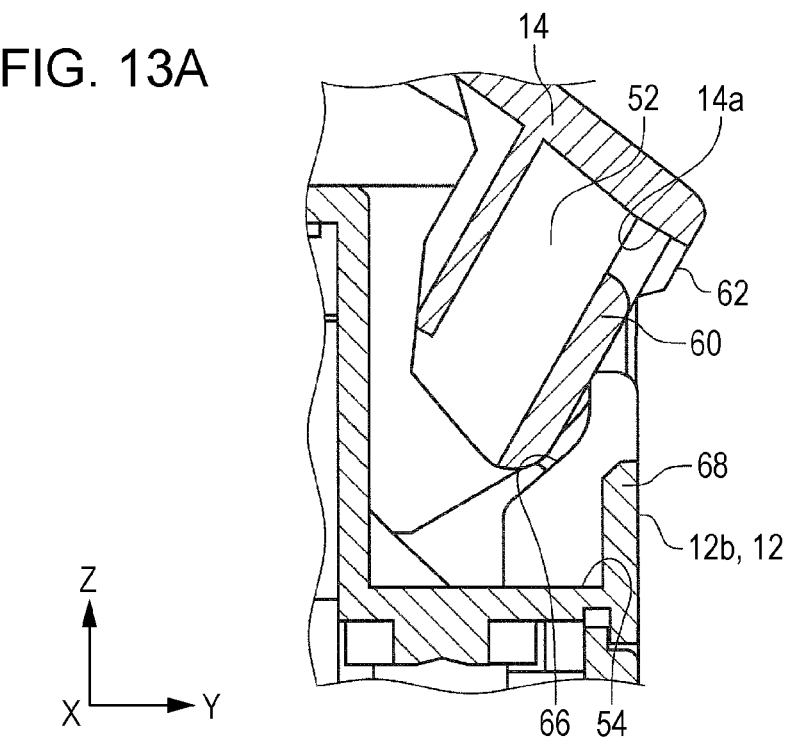
FIGS. 13A and 13B show the states of the restriction part and the fulcrum portion, respectively, when the pivot angle is 30°.
Figure 13B:
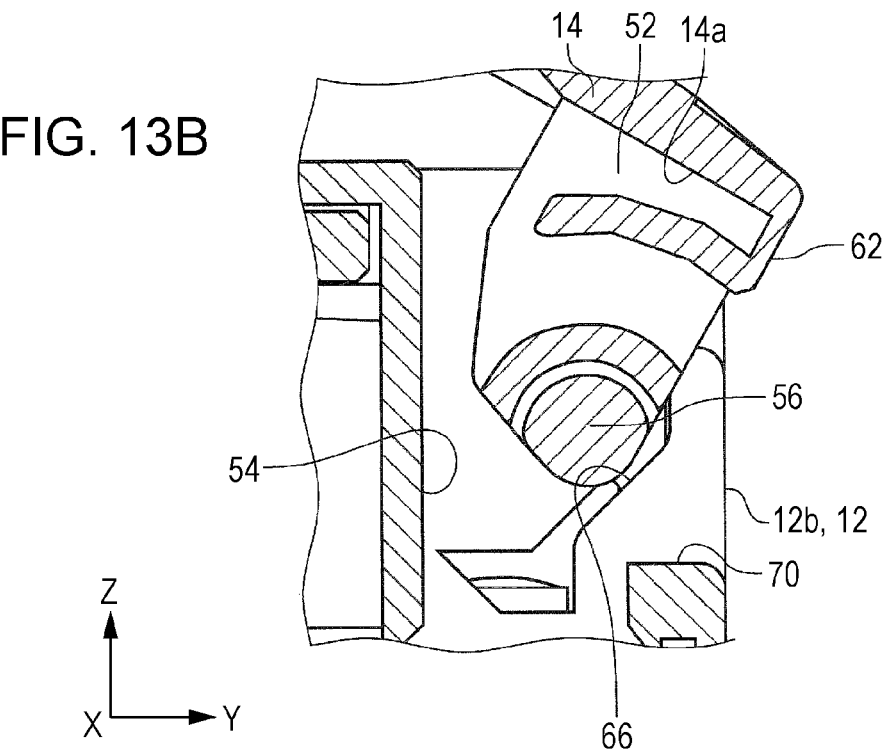
Figure 14A:
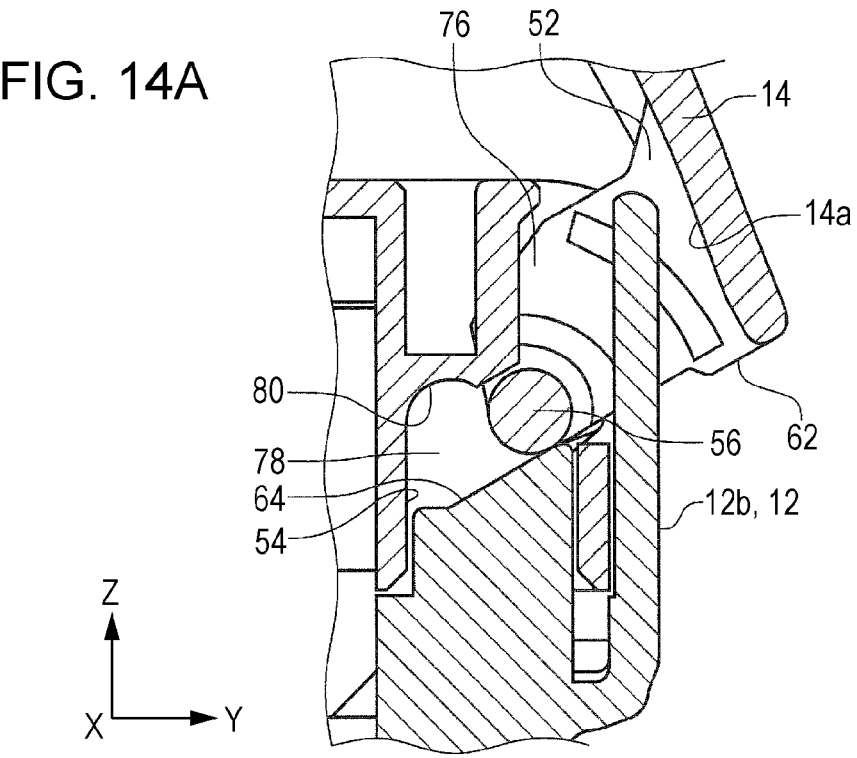
FIGS. 14A and 14B show the states of the pivot shaft and the movement part, respectively, when the pivot angle is 60°.
Figure 14B:
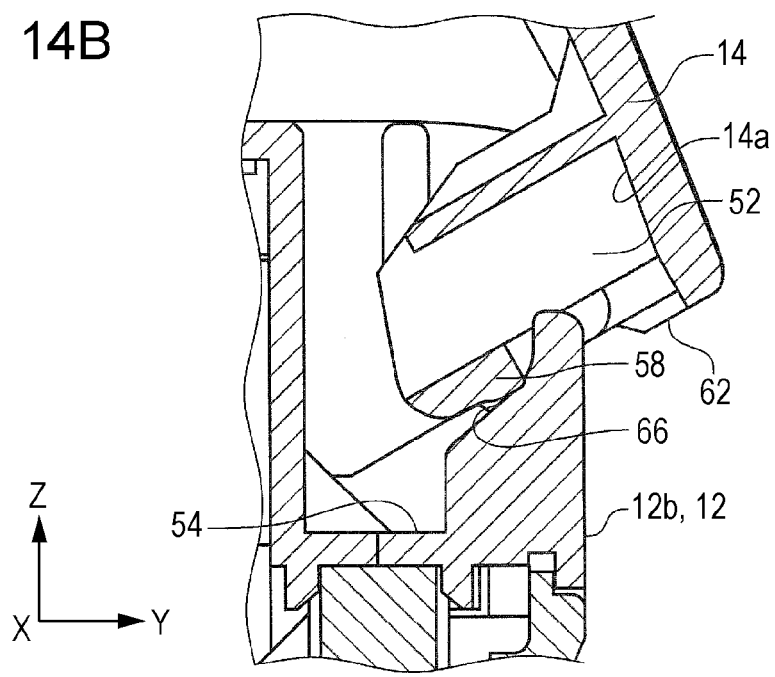
Figure 15A:
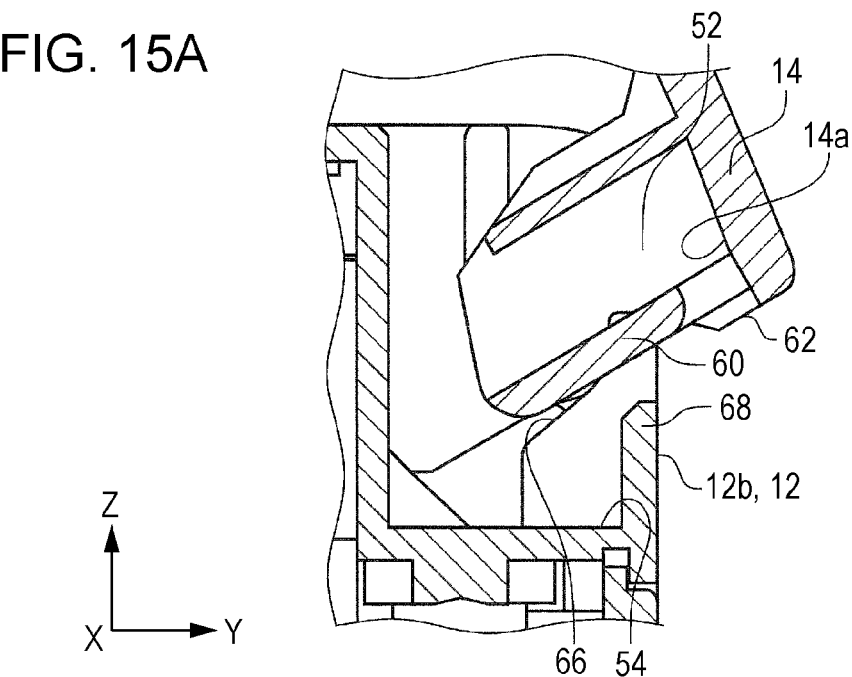
FIGS. 15A and 15B show the states of the restriction part and the fulcrum portion, respectively, when the pivot angle is 60°.
Figure 15B:
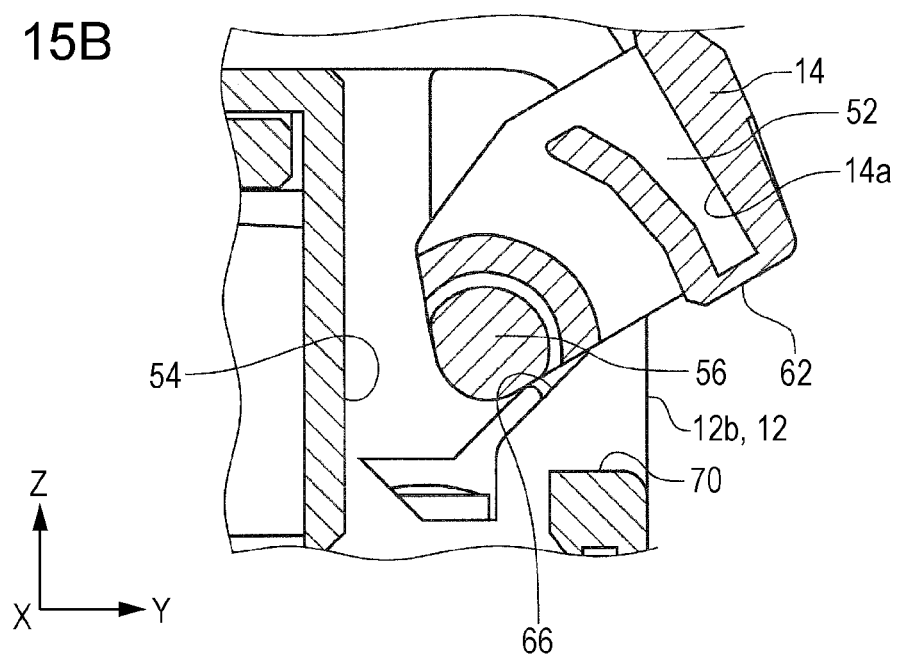
Figure 16A:
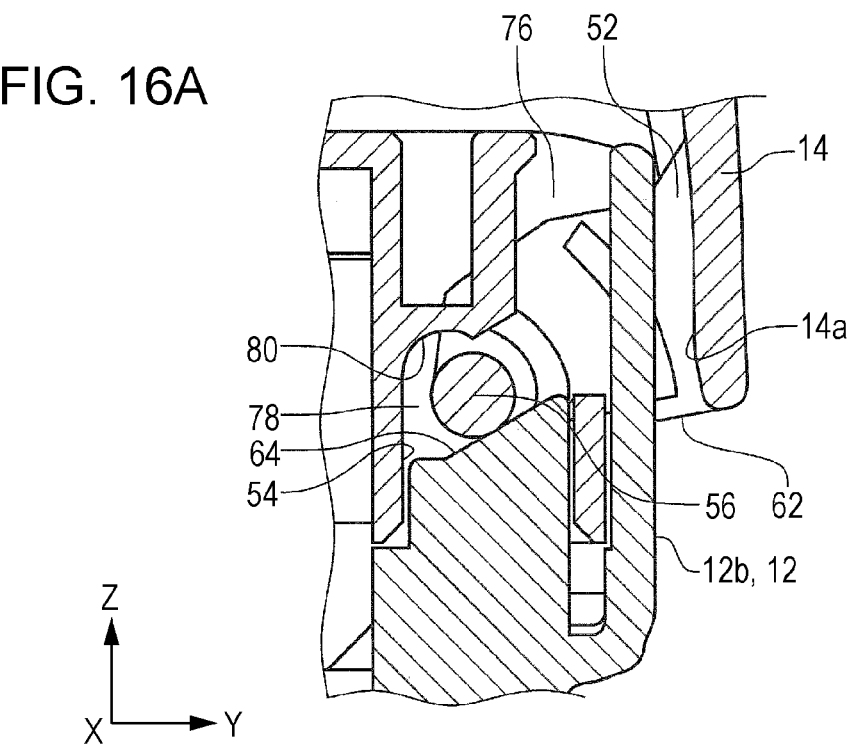
FIGS. 16A and 16B show the states of the pivot shaft and the movement part, respectively, when the pivot angle is 80°.
Figure 16B:
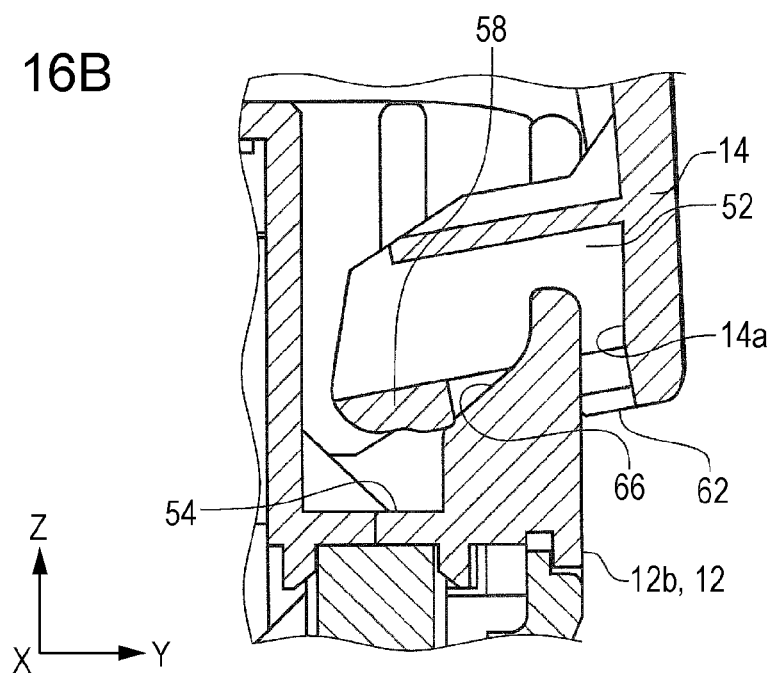
Figure 17A:
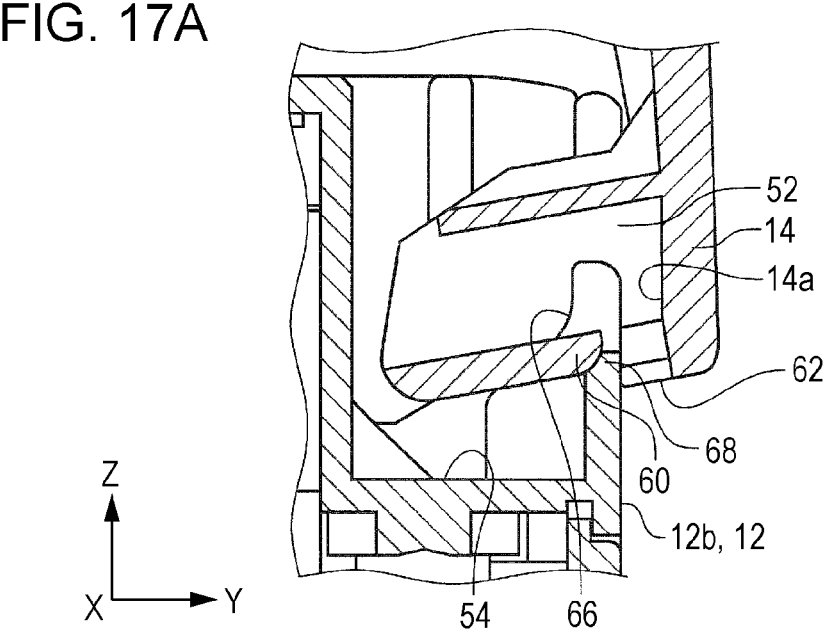
FIGS. 17A and 17B show the states of the restriction part and the fulcrum portion, respectively, when the pivot angle is 80°.
Figure 17B:
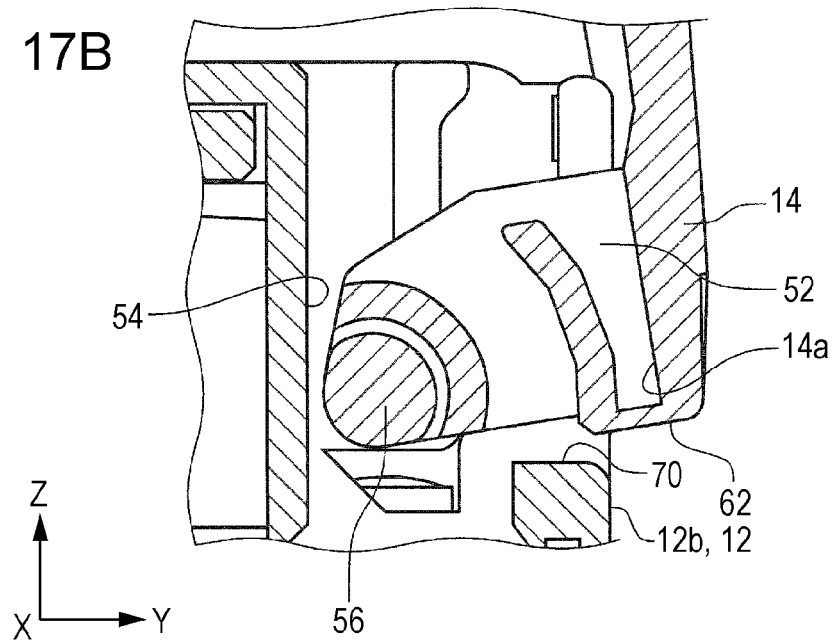
Figure 18A:
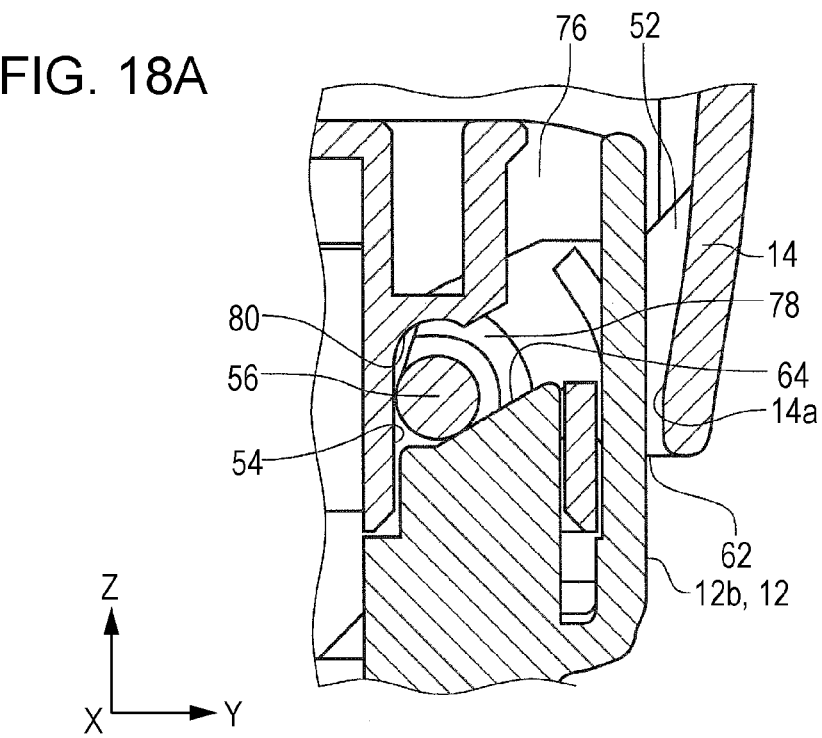
FIGS. 18A and 18B show the states of the pivot shaft and the movement part, respectively, when the pivot angle is 90°.
Figure 18B:
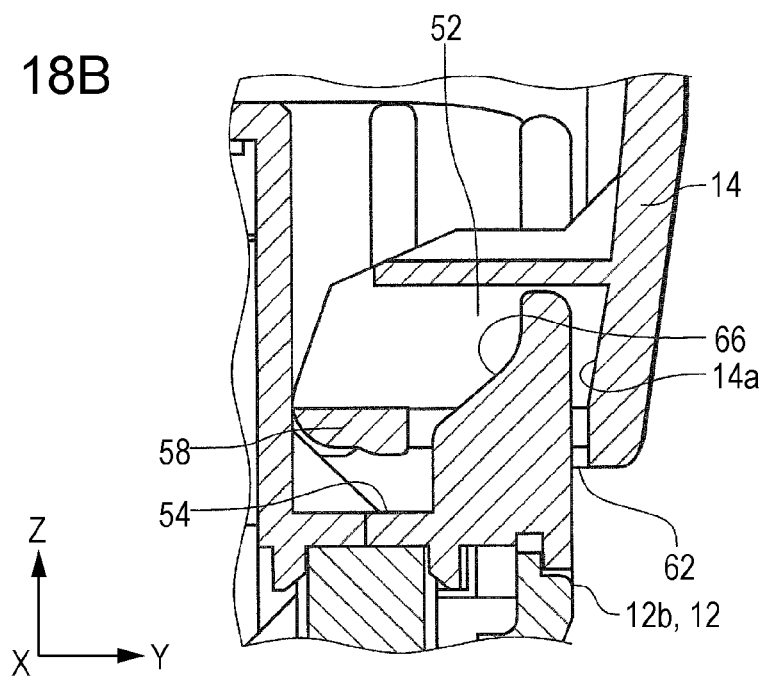

Referring to FIGS. 11B, 13B, 15B, 17B, 19B, and 23B, when the cover 14 starts to be pivoted relative to the housing 12 from a pivot angle of 0°, the fulcrum portions 62 rotate clockwise in FIG. 11B about the pivot shafts 56 (see FIGS. 11B, 13B, 15B, and 17B). When the pivot angle of the cover 14 relative to the housing 12 has reached 90° (see FIG. 19B), the fulcrum portions 62 come into contact with the fulcrum support portions 70.

Then, the center of pivot of the cover 14 is switched from the pivot shafts 56 to the contact portions between the fulcrum portions 62 and the fulcrum support portions 70. That is, when the pivot angle of the cover 14 relative to the housing 12 is between 0° and 90°, the cover 14 is pivoted about the pivot shafts 56 (serving as the center of pivot), and when the pivot angle of the cover 14 relative to the housing 12 is between 90° and 110°, the cover 14 is pivoted about the contact portions between the fulcrum portions 62 and the fulcrum support portions 70 (serving as the center of pivot).

Figure 22A:
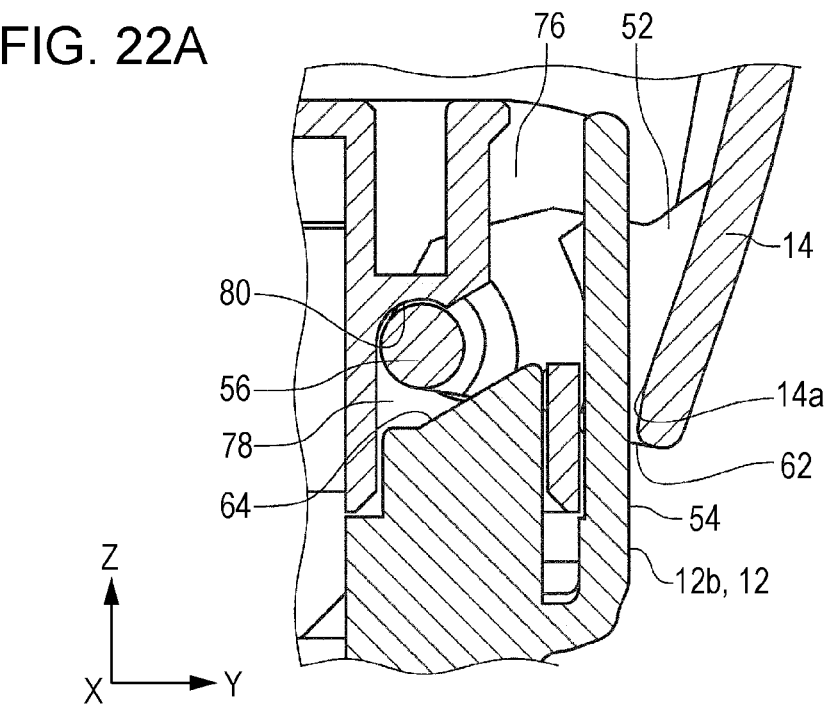
FIGS. 22A and 22B show the states of the pivot shaft and the movement part, respectively, when the pivot angle is 100°.
Figure 22B:
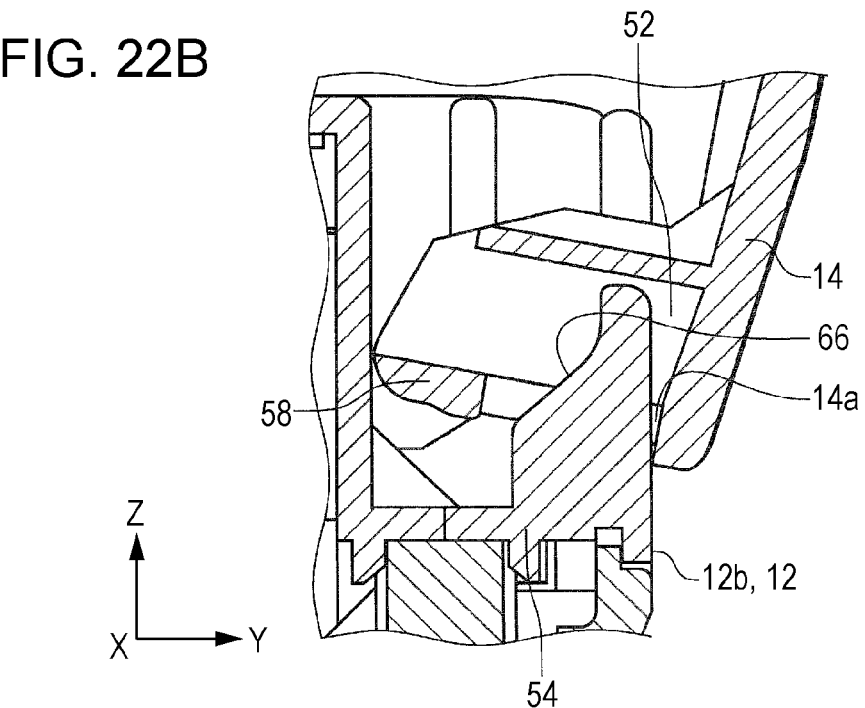

When the pivot angle of the cover 14 relative to the housing 12 has reached 110°, as shown in FIG. 22A, the pivot shafts 56 are retained by the retaining portion 80 of the guide portion 78, and a portion 14a of the cover 14 closer to the pivot shaft portion 52 (i.e., the base end) comes into contact with the rear side 12b of the housing 12. As a result, the cover 14 is maintained open (second position).

Summary of Operation of Pivot Shaft, Bearing, Movement Part, Restriction Part, Fulcrum Portions, and Fulcrum Support Portions The operation of the pivot shafts 56, bearing 64, movement part 72, restriction part 74, fulcrum portions 62, and fulcrum support portions 70 will be summarized as follows: when the cover 14 is pivoted relative to the housing 12, the cover 14 is pivoted about the pivot shafts 56 (serving as the center of pivot) between pivot angles of 0° (first position) and 90°. At this time, the movement part 72 guides the pivot shafts 56 from the rear side 12b of the housing 12 toward the lower inside of the housing 12. When the pivot angle has reached 90°, the center of pivot of the cover 14 is switched from the pivot shafts 56 to the contact portions between the fulcrum portions 62 and the fulcrum support portions 70.

When the cover 14 at a pivot angle of 90° is pivoted to a pivot angle of 110° (second position) about the contact portions (center of pivot) between the fulcrum portions 62 and the fulcrum support portions 70, the restriction part 74 restricts the displacement of the pivot shafts 56 toward the rear side of the housing 12. Then, the pivot shafts 56 are displaced upward inside the guide portion 78. Thereafter, the pivot shafts 56 are retained by the retaining portion 80, and the portion 14a of the cover 14 closer to the pivot shaft portion 52 (base end) comes into contact with the rear side 12b of the housing 12, whereby the second position of the cover 14 relative to the housing 12 is maintained.

Figure 24:
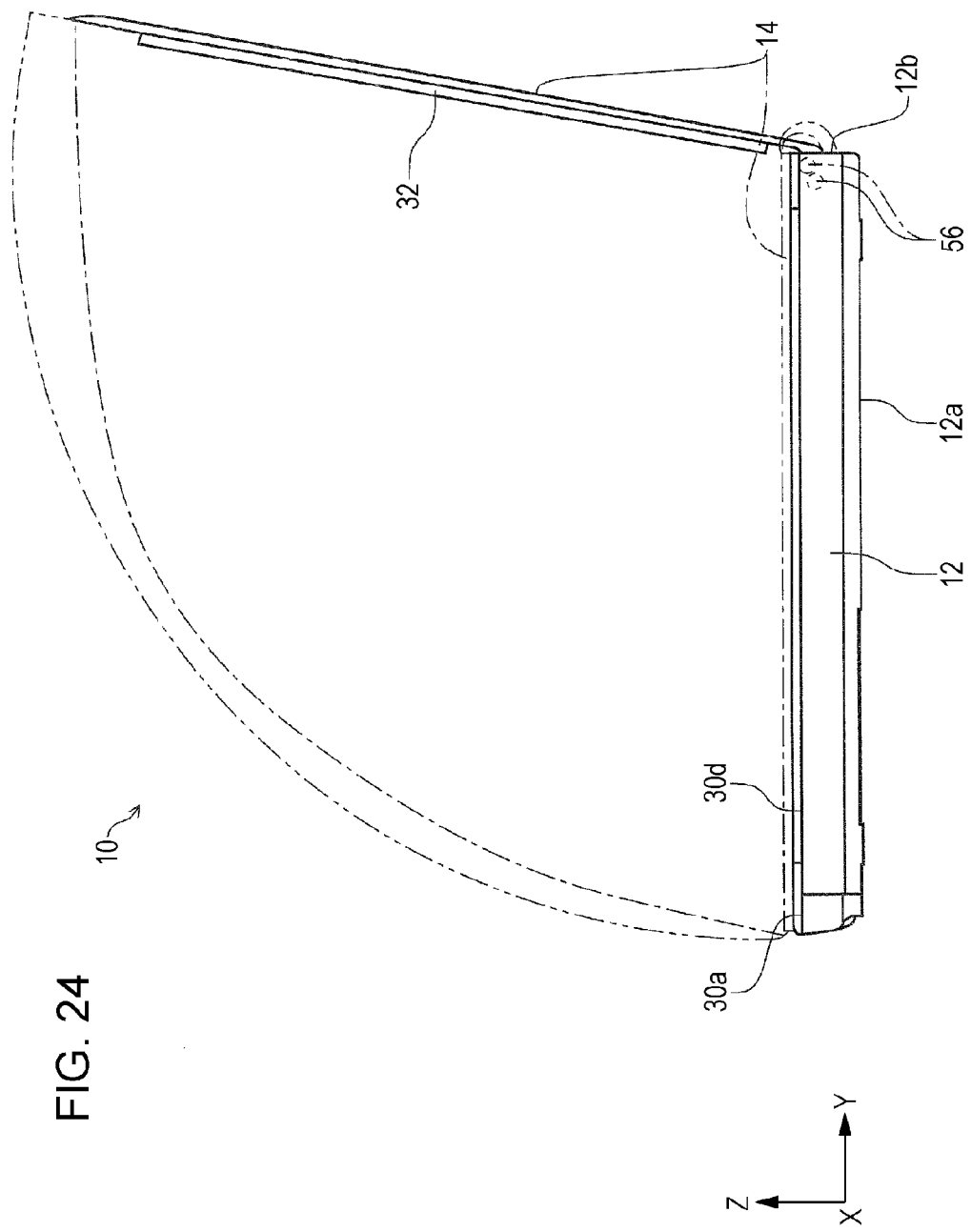
FIG. 24 is a side view showing pivot loci of a free end portion of the cover of the image reading apparatus.

In this embodiment, because the cover 14 is pivoted while displacing the pivot shafts 56 toward the inside of the housing 12 (−Y-axis direction in FIG. 24), the pivot locus of the end of the cover 14 closer to the pivot shaft (base end), indicated by a one-dot chain line at the rear side 12b in FIG. 24, is smaller than that when the pivot shafts 56 are fixed, indicated by a two-dot chain line at the rear side 12b in FIG. 24. That is, a space for opening/closing the cover 14 is reduced at the rear side 12b of the housing 12.

In this embodiment, the bearing 64 that receives the pivot shafts 56 of the cover 14 has the guide portion 78 that guides the pivot shafts 56 toward the inside of the housing 12 when the cover 14 is pivoted from the first position to the second position. Hence, when the cover 14 is pivoted from the first position to the second position, the pivot shafts 56 enter the guide portion 78, causing the portion of the cover 14 closer to the pivot shafts (i.e., the base end opposite from the free end) to be pivoted at a position closer to the housing 12. In this way, a space for opening/closing the cover 14, in particular, a space required around the housing 12, is reduced.

Furthermore, because the cover 14 is pivoted relative to the housing 12 while displacing the pivot shafts 56 downward, toward the inside of the housing 12, the pivot locus of the free end of the cover 14 according to this embodiment, indicated by a one-dot chain line in FIG. 24, is smaller than that with fixed pivot shafts, indicated by a two-dot chain line in FIG. 24. That is, the space for opening/closing the cover 14 is reduced.

In this embodiment, the guide portion 78 has such a shape that it guides the pivot shafts 56 toward the lower inside of the housing 12. Hence, when the cover 14 is pivoted from the first position to the second position, the pivot shafts 56 are guided downward, making the free end of the cover 14 to be pivoted at a lower side. Thus, the space for opening/closing the cover 14, in particular, the space required above the housing 12, is reduced.

Furthermore, in this embodiment, when the cover 14 is maintained in the second position relative to the housing 12, the pivot shafts 56 are retained by the retaining portion 80, and the portion 14a of the cover 14 closer to the pivot shafts 56 is supported by the rear side 12b of the housing 12. Hence, there is no need to provide the housing 12 with a pivot support portion that projects backward from the rear side 12b of the housing 12 to restrict pivoting of the cover 14, while supporting the cover 14, whereby it is possible to reduce the size of the device.

Furthermore, because the configuration according to this embodiment includes the movement part 72 that allows the pivot shafts 56 to move into the guide portion 78 when the cover 14 is pivoted from the first position to the second position, when the cover 14 is pivoted from the first position to the second position, the pivot shafts 56 reliably move into the guide portion 78.

Because the movement part 72 includes the guiding surface 66 extending toward the inside of the housing 12; and the guided portion 58 that pivots with the pivot shafts 56 and comes into contact with the guiding surface 66 to be guided toward the inside of the housing 12 when the cover 14 is pivoted from the first position to the second position, the structure of the movement part 72 may be simplified, reducing the space.

Furthermore, the configuration according to this embodiment includes the restriction part 74 that restricts the movement of the pivot shafts 56 toward the outside of the housing 12 when the cover 14 is pivoted from the first position to the second position. Thus, it is possible to prevent the pivot shafts 56 from coming off the guide portion 78 when the cover 14 is pivoted from the first position to the second position.

The second position of the cover 14 relative to the housing 12 is maintained by contact between the pivot shafts 56 and the inner upper part of the guide portion 78. Thus, the part for maintaining the second position of the cover 14 is formed at low cost.

Furthermore, because the contact between the pivot shafts 56 and the inner upper part of the guide portion 78 is achieved by upward displacement of the pivot shafts 56, caused by pivoting of the cover 14 about the fulcrum portions 62, the pivot shafts 56 are reliably brought into contact with the inner upper part of the guide portion 78. Furthermore, because the retaining portion 80 for retaining the pivot shafts 56 is formed in the inner upper part of the guide portion 78 in this embodiment, the second position of the cover 14 is more reliably maintained.

Furthermore, in this embodiment, the bearing 64 has the displacement allowance portion 76 that allows the pivot shafts 56 to be displaced in a direction intersecting the document mounting surface 28, i.e., a direction in which the cover 14 moves toward and away from the housing 12, when the cover 14 is in the first position. Hence, the positional freedom of the cover 14 relative to the housing 12 when the cover 14 is in the first position is ensured, enabling to meet various needs, such as the use of thick documents.

In this embodiment, when the cover 14 is in the second position, displacement of the pivot shafts 56, within the guide portion 78, in a direction in which the cover 14 moves away from the housing 12 is restricted. Hence, rattling of the cover 14 when in the second position is suppressed.

Second Embodiment

Referring to FIGS. 25A to 29, a second embodiment of an opening/closing device that opens and closes the cover 14 will be described. An opening/closing device 82 according to the second embodiment is different from that according to the first embodiment in that the pivot shaft also serves as the movement part.

Figure 25A:
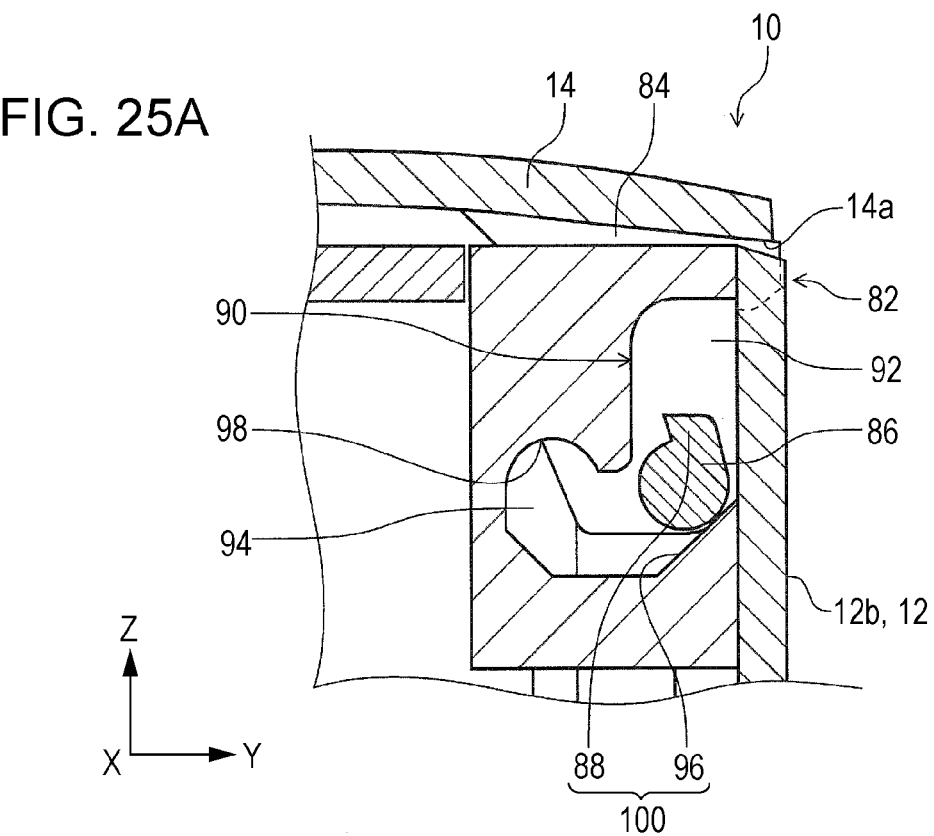
FIGS. 25A and 25B are vertical sectional views showing that a pivot shaft according to a second embodiment is at a pivot angle of 0° and 20°, respectively.

Referring to FIG. 25A, the cover 14 is in the first position relative to the housing 12. The opening/closing device 82 according to the second embodiment has a pivot shaft 86 in a pivot shaft portion 84 of the cover 14. The pivot shaft 86 has a projection 88 projecting in the radial direction from the pivot shaft 86.

Furthermore, a bearing 90 is provided at an end closer to the rear side 12b of the housing 12. The bearing 90 includes a displacement allowance portion 92 and a guide portion 94. The guide portion 94 includes a guiding surface 96 provided at a position close to the rear side 12b of the housing 12, and a retaining portion 98 formed at the inner upper part of the housing 12. The guiding surface 96 extends diagonally downward in a direction intersecting the document mounting surface 28, toward the inside of the housing 12, from the rear side 12b of the housing 12.

Figure 25B:
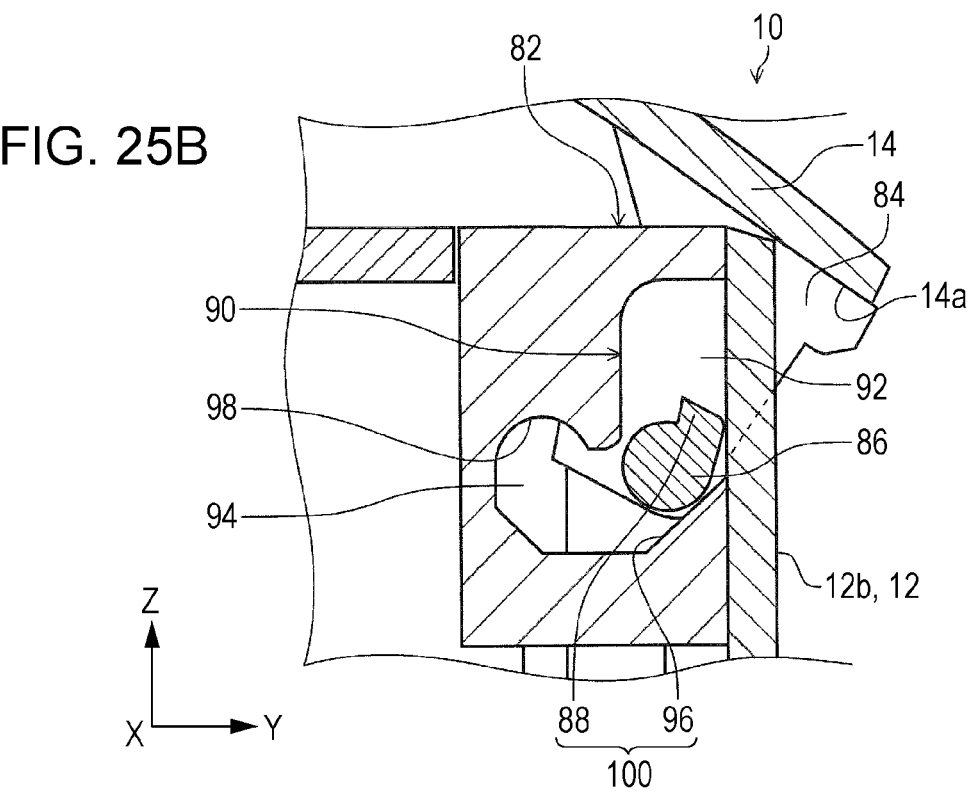
Figure 26A:
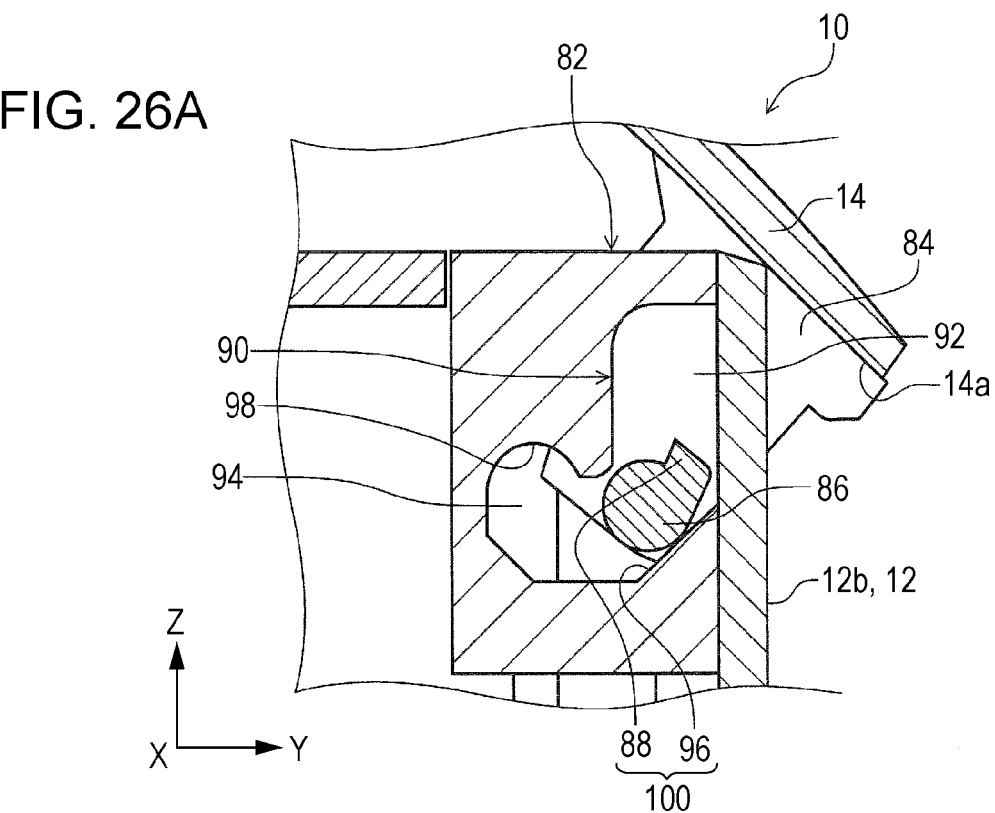
FIGS. 26A and 26B are vertical sectional views showing that the pivot shaft according to the second embodiment is at a pivot angle of 40° and 60°, respectively.
Figure 26B:
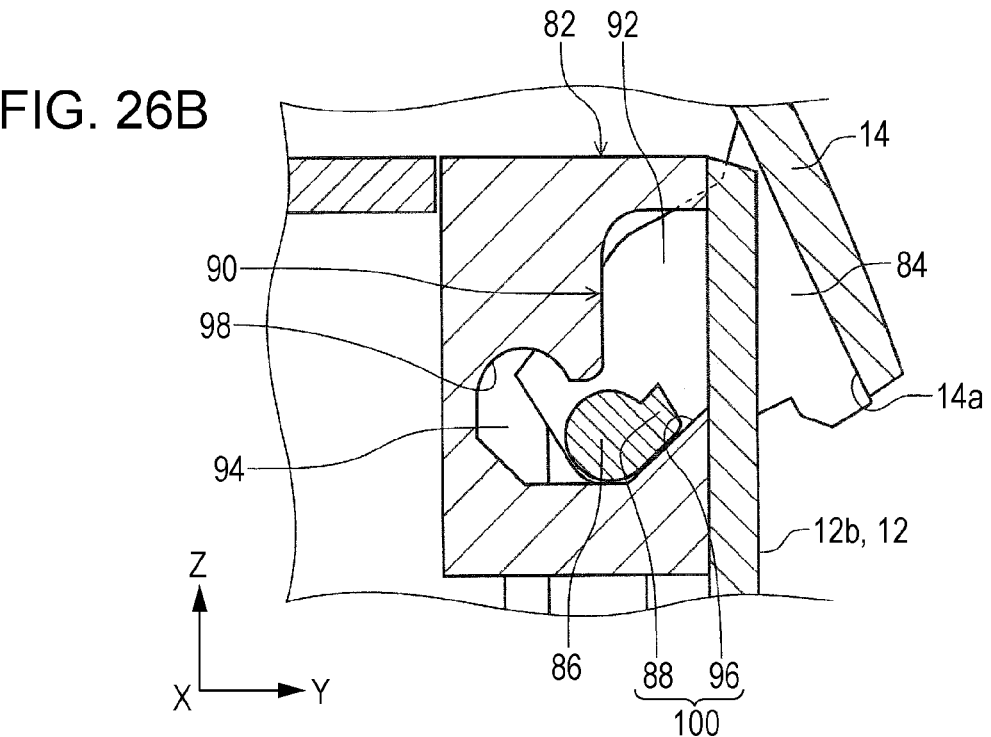

Referring to FIGS. 25B and 26B, when the cover 14 is pivoted from the first position to the second position relative to the housing 12, the projection 88 provided on the pivot shaft 86 is pivoted clockwise in FIG. 25B about the pivot shaft 86, serving as the center of pivot. At this time, as the projection 88 is pivoted, it comes into contact with the side surface, inside the bearing 90, on the rear side 12b of the housing 12 and continues to be pivoted, thereby pushing the pivot shaft 86 toward the inside of the housing 12. In this way, the pivot shaft 86 moves downward, toward the inside of the housing 12, from the displacement allowance portion 92, along the guiding surface 96. That is, the projection 88 of the pivot shaft 86 and the guiding surface 96 of the bearing 90 function as a movement part 100.

Figure 27A:
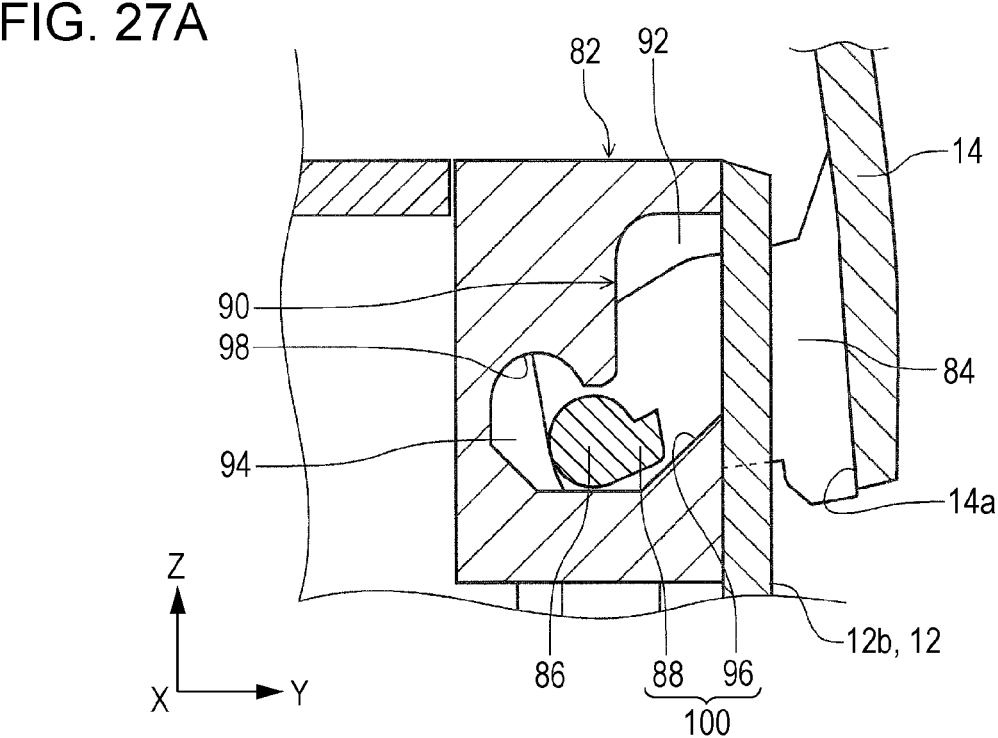
FIGS. 27A and 27B are vertical sectional views showing that the pivot shaft according to the second embodiment is at a pivot angle of 80° and 90°, respectively.
Figure 27B:
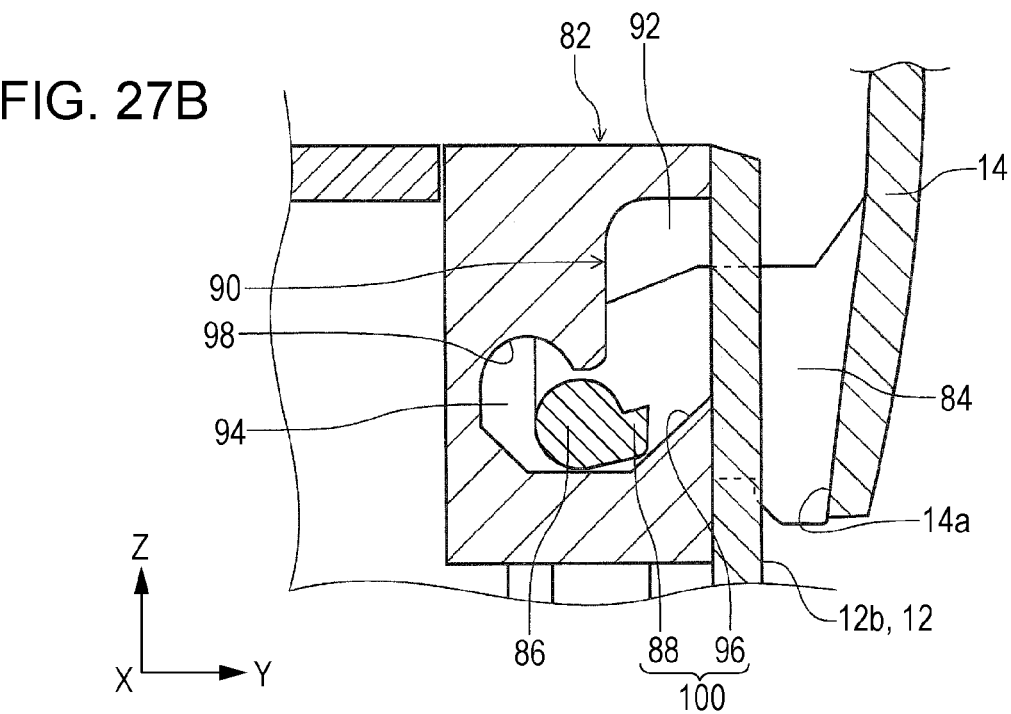
Figure 28A:
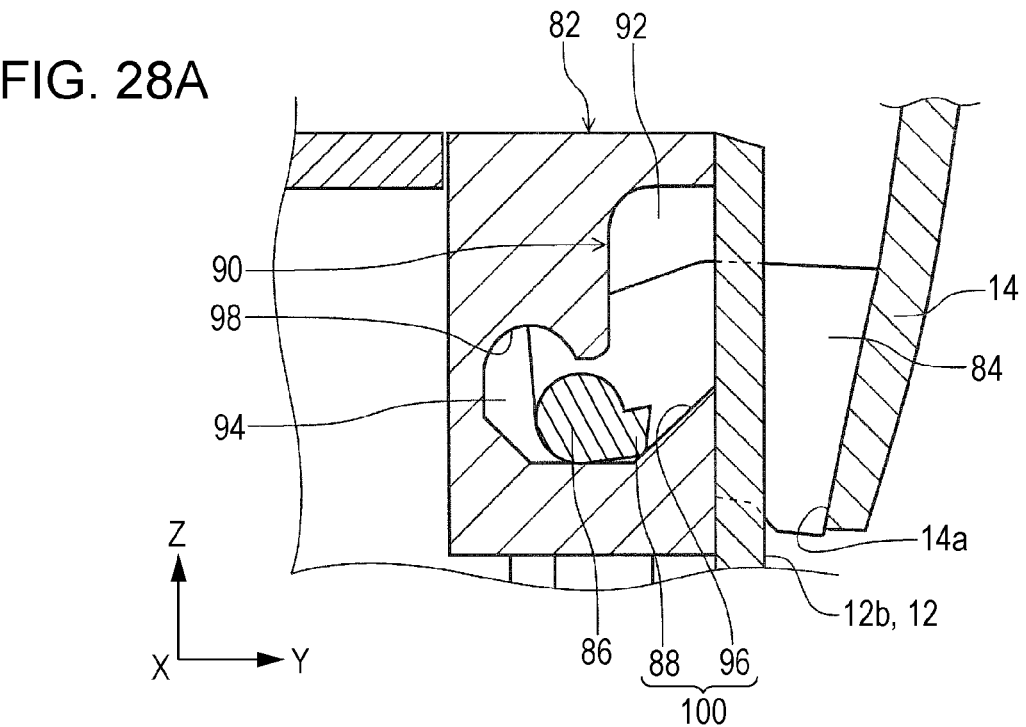
FIGS. 28A and 28B are vertical sectional views showing that the pivot shaft according to the second embodiment is at a pivot angle of 95° and 100°, respectively.

Next, referring to FIGS. 27A and 28A, when the cover 14 in a state shown in FIG. 26B is further pivoted relative to the housing 12, the projection 88 comes into contact with the guiding surface 96. Then, as the pivot shaft 86 is pivoted, the projection 88 pushes the guiding surface 96. As a result, the projection 88 receives the reaction force from the guiding surface 96 and is moved further toward the inside of the housing 12.

Figure 28B:
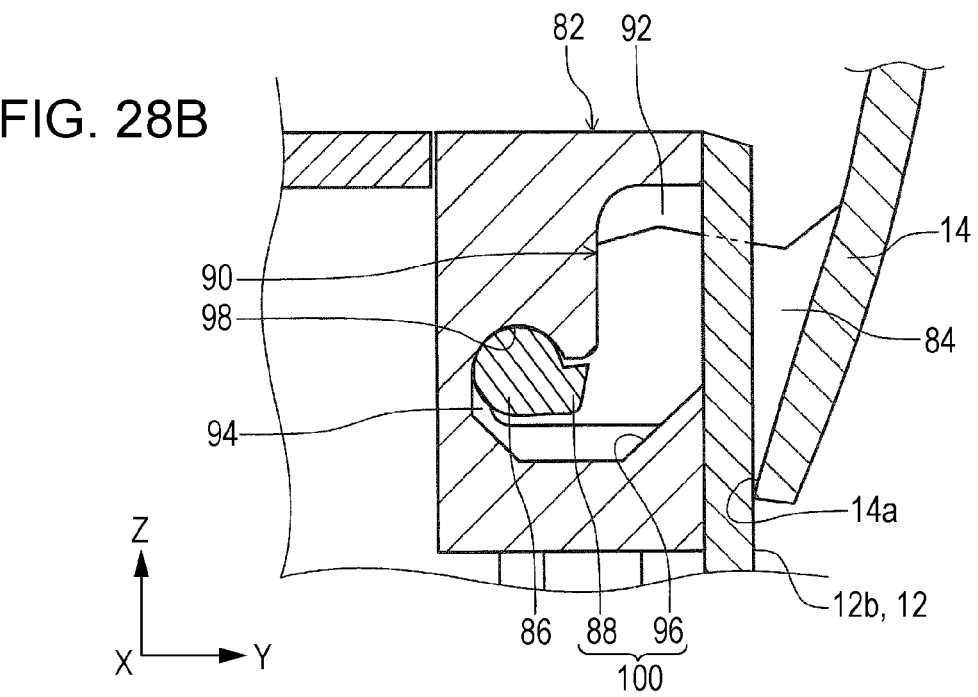

As shown in FIG. 28B, when the cover 14 in the state shown in FIG. 28A is pivoted clockwise in FIG. 28A relative to the housing 12, the portion 14a on the free end side (i.e., base end) of the cover 14 comes into contact with the rear side 12b of the housing 12. As a result, the center of pivot of the cover 14 is switched from the pivot shaft 86 to the contact portion between the rear side 12b and the portion 14a on the free end side of the cover 14.

As a result, the pivot shaft 86 is pivoted clockwise in FIG. 28B about the contact portion between the rear side 12b of the housing 12 and the portion 14a on the free end side of the cover 14, serving as the center of pivot, and enters the retaining portion 98 of the guide portion 94, where it is retained. Because the pivot shaft 86 is retained by the retaining portion 98, the pivot of the cover 14 relative to the housing 12 is restricted. Accordingly, the cover 14 can maintain the second position (FIG. 28B) relative to the housing 12.

Figure 29:
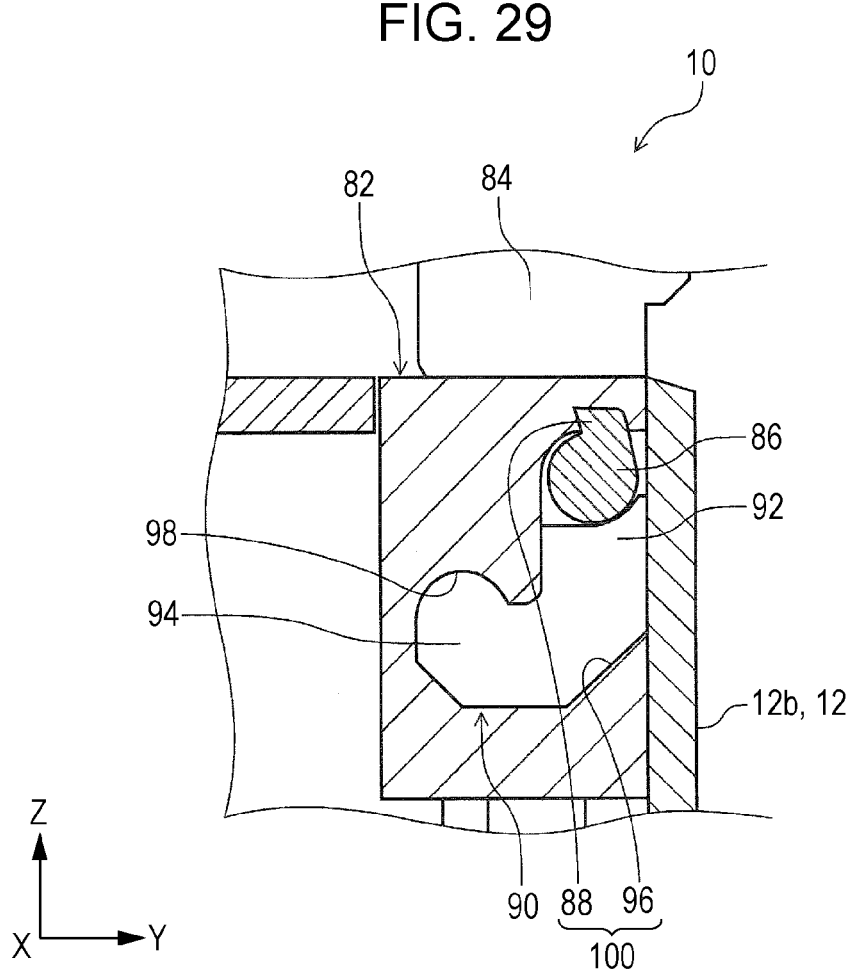
FIG. 29 is a vertical sectional view showing that the pivot shaft according to the second embodiment is displaced in a displacement allowance portion.

Also in this embodiment, as shown in FIG. 29, the bearing 90 has the displacement allowance portion 92. Hence, when the cover 14 is in the first position relative to the housing 12, the pivot shaft 86 may be displaced in a direction intersecting the document mounting surface 28, within the displacement allowance portion 92. Accordingly, also in this embodiment, when the cover 14 is in the first position relative to the housing 12, the cover 14 may be displaced in a direction toward or away from the housing 12. In this way, the positional freedom of the cover 14 relative to the housing 12 can be ensured, enabling to meet various needs, including the use of thick documents.

In this embodiment, the movement part 100 includes the guiding surface 96 extending toward the inside of the housing 12, and the projection 88 provided on the pivot shaft 86, the projection 88 coming into contact with the guiding surface 96 when the cover 14 is pivoted from the first position to the second position to guide the pivot shaft 86 toward the inside of the housing 12. Hence, the movement part 100 can be formed in a simple structure and at low cost.

Third Embodiment

Figure 30:
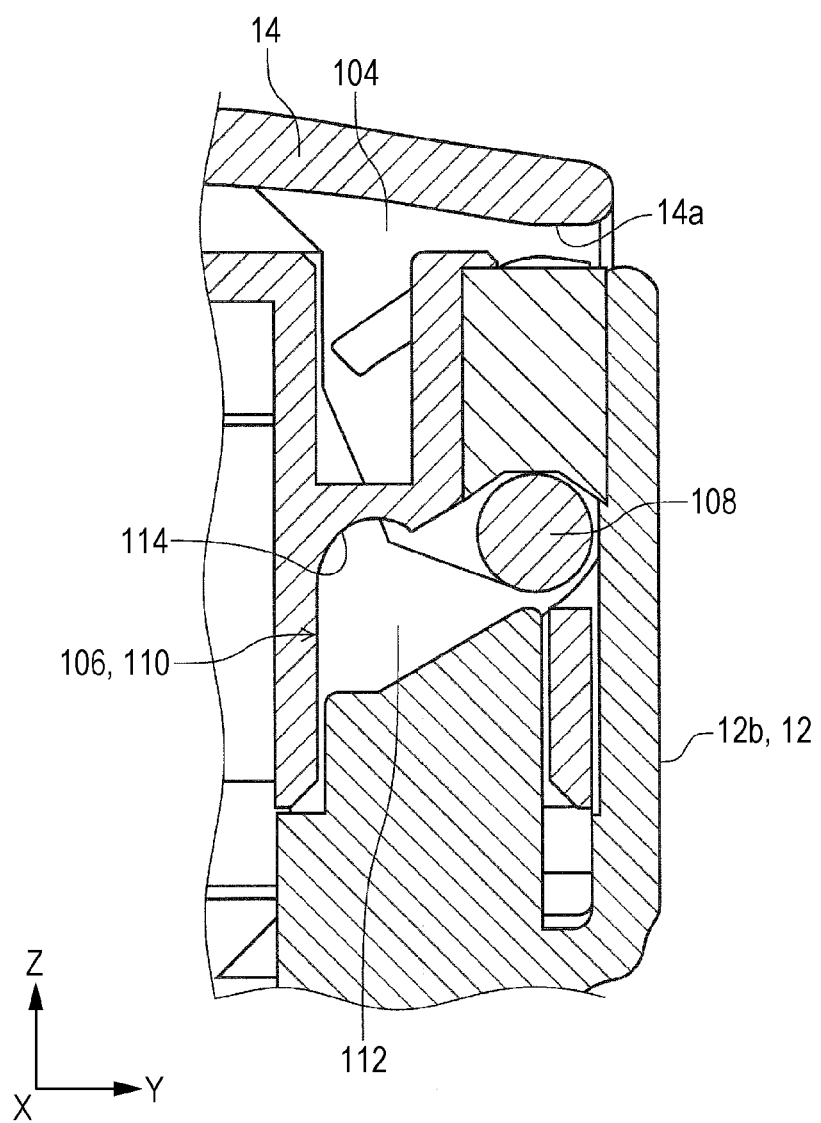
FIG. 30 is a vertical sectional view of a pivot shaft and a bearing according to a third embodiment.

Referring to FIG. 30, a third embodiment of an opening/closing device that opens and closes the cover 14 will be described. An opening/closing device 102 according to the third embodiment is different from the opening/closing devices 50 according to the first embodiment in that the bearing does not have a displacement allowance portion.

Referring to FIG. 30, the opening/closing device 102 is provided at an end closer to the rear side 12b of the housing 12. The opening/closing device 102 includes a pivot shaft portion 104 provided on the cover 14 and a bearing portion 106 provided on the end closer to the rear side 12b of the housing 12. The pivot shaft portion 104 has a pivot shaft 108. Furthermore, the bearing portion 106 has a bearing 110, and the bearing 110 has only a guide portion 112. The guide portion 112 has a retaining portion 114 formed at the inner upper part of the housing 12.

In this embodiment, the movement of the pivot shaft 108 relative to the bearing 110 when the cover 14 is pivoted from the first position to the second position relative to the housing 12 is the same as that according to the first embodiment, so, the description thereof will be omitted. Also in this embodiment, a movement part 72, a restriction part 74, fulcrum portions 62, and fulcrum support portions 70 (not shown) are provided.

Because the bearing 110 does not have a displacement allowance portion in this embodiment, when the cover 14 is in the first position relative to the housing 12, the cover 14 cannot be displaced in a direction toward or away from the housing 12, in a direction intersecting the document mounting surface 28. However, similarly to the first embodiment, the cover 14 is pivotable relative to the housing 12. Furthermore, because the bearing 110 does not have the displacement allowance portion, the structure of the bearing 110 may be simple.

Modifications of First to Third Embodiments

1. In the above-described embodiments, although the opening/closing devices 50, 82, and 102 that open and close the cover 14 are formed as an opening/closing device that opens and closes a cover of the image reading apparatus 10, they may be formed as an opening/closing device that opens and closes a cover of a recording device.

2. The bearing portion 54 (fixed portion) according to the above-described embodiment is configured such that the bearing 64 is formed of the housing 12 and the rear frame 30b, and the guiding surface 66, the restricting portions 68, and the fulcrum support portions 70 are formed of the rear frame 30b, separately from the bearing 64. However, instead of this configuration, for example, the aforementioned components may be formed as a single part on one member, such as the housing 12 or the rear frame 30b.

The above description will be summarized as follows: the image reading apparatus 10 according to the above-described embodiments includes the housing 12; the cover 14 that is switchable between the first position in which it covers the housing 12 and the second position in which it uncovers the housing 12 via pivoting about the pivot shafts 56, 86, or 108; the document table 16 on which a document is mounted, the document table being covered or uncovered by the cover 14; and the image reading unit 24 that reads the document mounted on the document table 16. The bearings 64, 90, and 110 that receive the pivot shafts 56, 86, and 108 of the cover 14 have the guide portions 78, 94, and 112 that guide the pivot shafts 56, 86, and 108 toward the inside of the housing 12 when the cover 14 is pivoted from the first position to the second position.

The guide portions 78, 94, and 112 have such shapes that they guide the pivot shafts 56, 86, and 108 downward, toward the inside of the housing 12. Furthermore, the movement parts 72 and 100 that move the pivot shafts 56, 86, and 108 into the guide portions 78, 94, and 112 when the cover 14 is pivoted from the first position to the second position are provided.

In the opening/closing devices 50 and 102, the movement part 72 includes the guiding surface 66 extending toward the inside of the housing 12, and the guided portion 58 that pivots with the pivot shafts 56 and 108 and comes into contact with the guiding surface 66 to be guided toward the inside of the housing 12 when the cover 14 is pivoted from the first position to the second position.

The opening/closing devices 50 and 102 include the restriction part 74 that restricts the movement of the pivot shafts 56 and 108 toward the outside of the housing 12 when the cover 14 is pivoted from the first position to the second position.

The second position of the cover 14 is maintained by contact between the pivot shafts 56, 86, and 108 and the inner upper parts of the guide portions 78, 94, and 112.

The opening/closing devices 50 and 102 include the fulcrum portions 62 that are pivoted with the pivot shafts 56 and 108, and the fulcrum support portions 70 with which the fulcrum portions 62 come into contact when the cover 14 is pivoted from the first position to the second position. The contact between the pivot shafts 56 and 108 and the inner upper parts of the guide portions 78 and 112 is achieved by upward displacement of the pivot shafts 56 and 108 caused by pivoting of the cover about the fulcrum portions 62.

In the image reading apparatus 10, the movement part 100 includes the guiding surface 96 extending toward the inside of the housing 12, and the projection 88 provided on the pivot shaft 86, the projection coming into contact with the guiding surface 96 to guide the pivot shaft 86 toward the inside of the housing 12 when the cover 14 is pivoted from the first position to the second position.

The opening/closing devices 50, 82, and 102 that open and close the cover 14 include the housing 12, and the cover 14 that is switchable between the first position in which it covers the housing 12 and the second position in which it uncovers the housing 12 via pivoting about the pivot shafts 56, 86, and 108. The bearings 64, 90, and 110 that receive the pivot shafts 56, 86, and 108 of the cover 14 have the guide portions 78, 94, and 112 that guide the pivot shafts 56, 86, and 108 toward the inside of the housing 12 when the cover 14 is pivoted from the first position to the second position. The guide portions 78, 94, and 112 have such shapes that they guide the pivot shafts 56, 86, and 108 downward, toward the inside of the housing 12, and have the movement parts 72 and 100 that move the pivot shafts 56, 86, and 108 into the guide portions 78, 94, and 112 when the cover 14 is pivoted from the first position to the second position.

Note that the invention is not limited to the above-described embodiments, and it may be variously modified within a scope of the invention described in Claims, and such modifications are of course included in the scope of the invention.

The entire disclosure of Japanese Patent Application No. 2014-146850, filed Jul. 17, 2014 is expressly incorporated by reference herein.

What is claimed is:

1. An image reading apparatus comprising:
a housing includes a document table that reads a document;
an opening/closing member includes a cover member and a pivot shaft portion protruding from the cover downward in the vertical direction;
the pivot shaft portion includes a pivot shaft;
the cover member that is switchable between a first position in which it covers the housing and a second position in which it uncovers the housing via pivoting about a pivot shaft;
wherein the pivot shaft is movable in an up and down direction inside of the housing and
a bearing that receives the pivot shaft has a guide portion disposed within the housing that guides the pivot shaft toward the inside of the housing when the cover member is pivoted from the first position to the second position.

2. The image reading apparatus according to claim 1, wherein the guide portion has such a shape that it guides the pivot shaft downward, toward the inside of the housing.

3. The image reading apparatus according to claim 1, further comprising a movement part that moves the pivot shaft into the guide portion when the opening/closing member is pivoted from the first position to the second position.

4. The image reading apparatus according to claim 3, wherein the movement part includes a guiding surface extending toward the inside of the housing, and a guided portion that pivots with the pivot shaft and comes into contact with the guiding surface to be guided toward the inside of the housing when the opening/closing member is pivoted from the first position to the second position.

5. The image reading apparatus according to claim 3, wherein the movement part includes a guiding surface extending toward the inside of the housing; and a projection provided on the pivot shaft and coming into contact with the guiding surface to guide the pivot shaft toward the inside of the housing when the opening/closing member is pivoted from the first position to the second position.

6. The image reading apparatus according to claim 1, further comprising a restriction part that restricts movement of the pivot shaft toward the outside of the housing when the opening/closing member is pivoted from the first position to the second position.

7. The image reading apparatus according to claim 1, wherein the second position of the opening/closing member is maintained by contact between the pivot shaft and an inner upper part of the guide portion.

8. The image reading apparatus according to claim 7, further comprising:
a fulcrum portion that pivots with the pivot shaft; and
a fulcrum support portion with which the fulcrum portion comes into contact when the opening/closing member is pivoted from the first position to the second position,
wherein the contact between the pivot shaft and the inner upper part of the guide portion is achieved by upward displacement of the pivot shaft caused by pivoting of the opening/closing member about the fulcrum portion.

9. An opening/closing device that opens and closes an opening/closing member, the device comprising:
a housing; and
an opening/closing member includes a cover member and a pivot shaft portion protruding from the cover downward in the vertical direction;
the pivot shaft portion includes a pivot shaft;
the cover member that is switchable between a first position in which it covers the housing and a second position in which it uncovers the housing via pivoting about the pivot shaft,
wherein the pivot shaft is movable in an up and down direction inside of the housing and
a bearing that receives the pivot shaft has a guide portion disposed within the housing that guides the pivot shaft toward the inside of the housing when the cover member is pivoted from the first position to the second position, wherein the guide portion has such a shape that it guides the pivot shaft downward, toward the inside of the housing, wherein a movement part that moves the pivot shaft into the guide portion when the cover member is pivoted from the first position to the second position is provided, and wherein the pivot shaft contacts the guide portion and moves along the guide portion as the cover member is pivoted between the first and second positions.

* * * * *